US010680906B2

(12) United States Patent
Funase

(10) Patent No.: US 10,680,906 B2
(45) Date of Patent: *Jun. 9, 2020

(54) INFORMATION MANAGEMENT METHOD, CONTROL SYSTEM, AND METHOD FOR CONTROLLING DISPLAY DEVICE

(71) Applicant: Panasonic Intellectual Property Corporation of America, Torrance, CA (US)

(72) Inventor: Kazuki Funase, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/941,550

(22) Filed: Mar. 30, 2018

(65) Prior Publication Data
US 2018/0227194 A1 Aug. 9, 2018

Related U.S. Application Data

(63) Continuation of application No. 14/385,892, filed as application No. PCT/JP2014/000313 on Jan. 22, 2014, now Pat. No. 9,967,152.

(30) Foreign Application Priority Data

Jan. 29, 2013 (JP) .................................. 2013-014255

(51) Int. Cl.
*G06F 3/048* (2013.01)
*H04L 12/24* (2006.01)
(Continued)

(52) U.S. Cl.
CPC ............ *H04L 41/22* (2013.01); *G06F 3/0484* (2013.01); *G06Q 10/06* (2013.01); *G06Q 30/0241* (2013.01)

(58) Field of Classification Search
CPC ... H04L 43/00; H04L 41/0681; G06F 3/1288; G06Q 10/06

See application file for complete search history.

(56) References Cited

U.S. PATENT DOCUMENTS 5,499,040 A  3/1996 McLaughlin
6,289,379 B1  9/2001 Urano
(Continued)

FOREIGN PATENT DOCUMENTS

JP    2001-60972    3/2001
JP    2001-359178   12/2001
(Continued)

OTHER PUBLICATIONS

International Search Report dated Apr. 22, 2014 in International (PCT) Application No. PCT/JP2014/000313.
(Continued)

*Primary Examiner* — Justin S Lee
(74) *Attorney, Agent, or Firm* — Wenderoth, Lind & Ponack, L.L.P.

(57) ABSTRACT

An information management method in a control system that collects log information regarding usage of a plurality of devices, the information management method including: a step of receiving judgment information indicating whether or not the log information is to be provided to a service operator from each of the plurality of devices; and a step of providing a command for causing a first image, which represents a device indicated by the judgment information as a device that provides the log information to a service operator, and a second image, which represents a device indicated by the judgment information as a device that does not provide the log information to a service operator, to be displayed in display modes that differ from each other to a
(Continued)

display device associated with the identifier in response to an access by the display device.

1 Claim, 37 Drawing Sheets

(51) Int. Cl.
    *G06Q 10/06*     (2012.01)
    *G06Q 30/02*     (2012.01)
    *G06F 3/0484*     (2013.01)

(56) References Cited

U.S. PATENT DOCUMENTS

| | | |
|---|---|---|
| 6,941,302 B1 | 9/2005 | Suchter |
| 2002/0024535 A1 | 2/2002 | Ueno |
| 2002/0025172 A1 | 2/2002 | Tsuda |
| 2002/0083162 A1 | 6/2002 | Oeda |
| 2003/0131061 A1 | 7/2003 | Newton |
| 2003/0158927 A1 | 8/2003 | Sagey et al. |
| 2003/0217181 A1 | 11/2003 | Kiiskinen |
| 2003/0237095 A1 | 12/2003 | Srinivas |
| 2004/0010325 A1 | 1/2004 | Naitoh |
| 2004/0111431 A1 | 6/2004 | Zeller |
| 2004/0239992 A1 | 12/2004 | Kawai |
| 2004/0261016 A1 | 12/2004 | Glass |
| 2006/0279774 A1 | 12/2006 | Matsuoka et al. |
| 2007/0016659 A1 | 1/2007 | Peck |
| 2007/0208749 A1 | 9/2007 | Price |
| 2008/0034306 A1 | 2/2008 | Ording |
| 2008/0216021 A1 | 9/2008 | Berning |
| 2009/0150574 A1 | 6/2009 | Kawahara |
| 2009/0156123 A1 | 6/2009 | Kim |
| 2010/0007515 A1 | 1/2010 | Ito |
| 2010/0076997 A1 | 3/2010 | Koike |
| 2010/0151816 A1 | 6/2010 | Besehanic |
| 2011/0085194 A1 | 4/2011 | Asari |
| 2011/0246945 A1 | 10/2011 | Caine |
| 2011/0295440 A1 | 12/2011 | Noma |
| 2012/0005232 A1 | 1/2012 | Oleynik |
| 2013/0069953 A1* | 3/2013 | Hautala ............... G06F 3/04817 345/467 |
| 2014/0075003 A1* | 3/2014 | Tanaka .................... H04L 41/50 709/223 |

FOREIGN PATENT DOCUMENTS

| | | |
|---|---|---|
| JP | 2003-323401 | 11/2003 |
| JP | 2006-72629 | 3/2006 |
| JP | 2006-344074 | 12/2006 |
| JP | 2010-20536 | 1/2010 |
| JP | 2010-86289 | 4/2010 |
| JP | 2011-253309 | 12/2011 |

OTHER PUBLICATIONS

Office Action dated Sep. 29, 2016 in U.S. Appl. No. 14/385,892.
Office Action dated May 3, 2017 in U.S. Appl. No. 14/385,892.
Office Action dated Sep. 8, 2017 in U.S. Appl. No. 14/385,892.

* cited by examiner

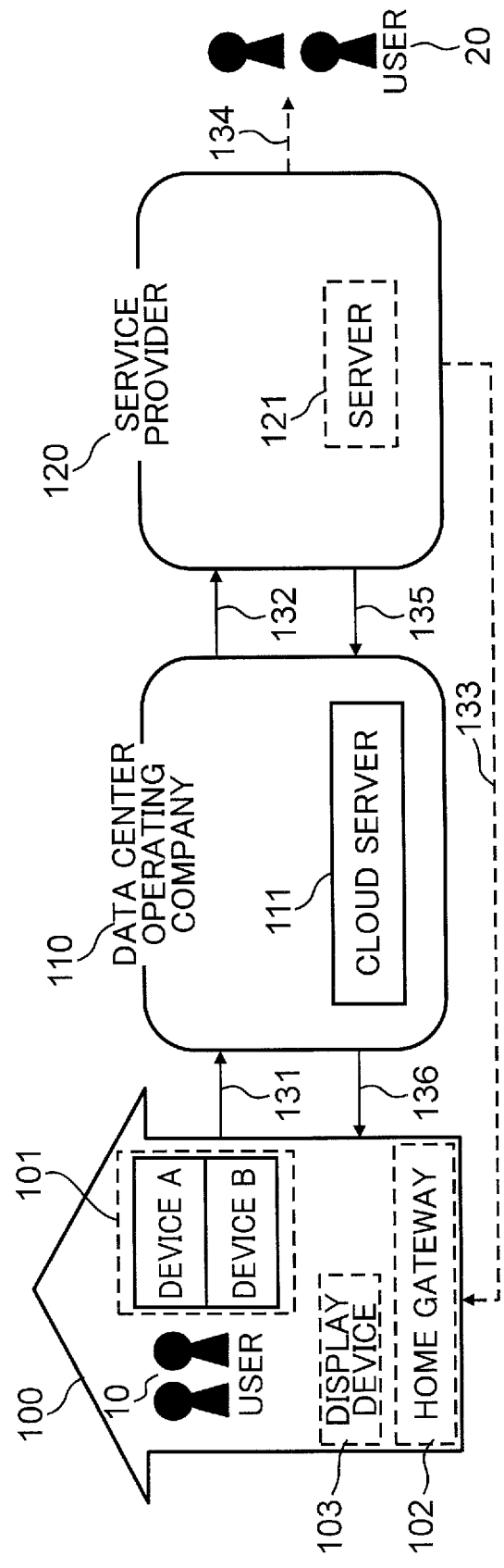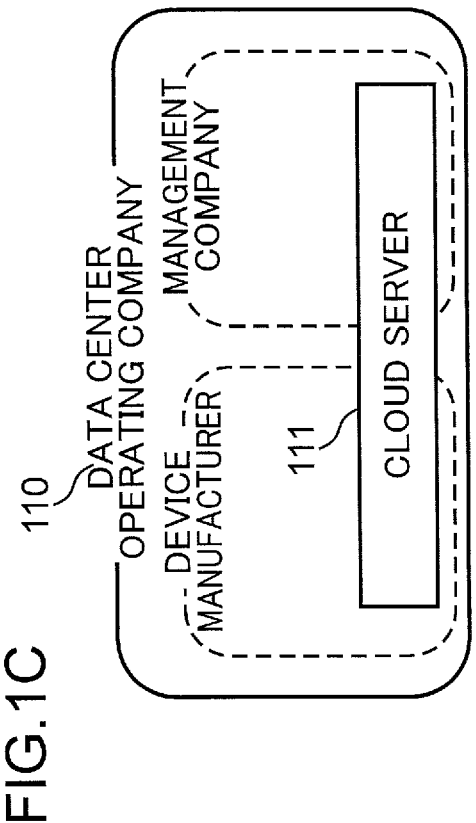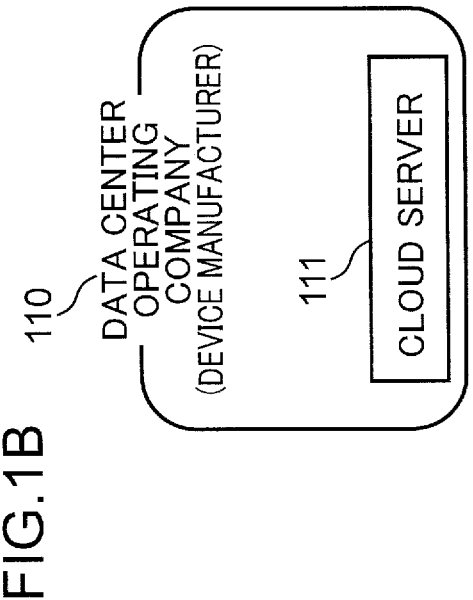

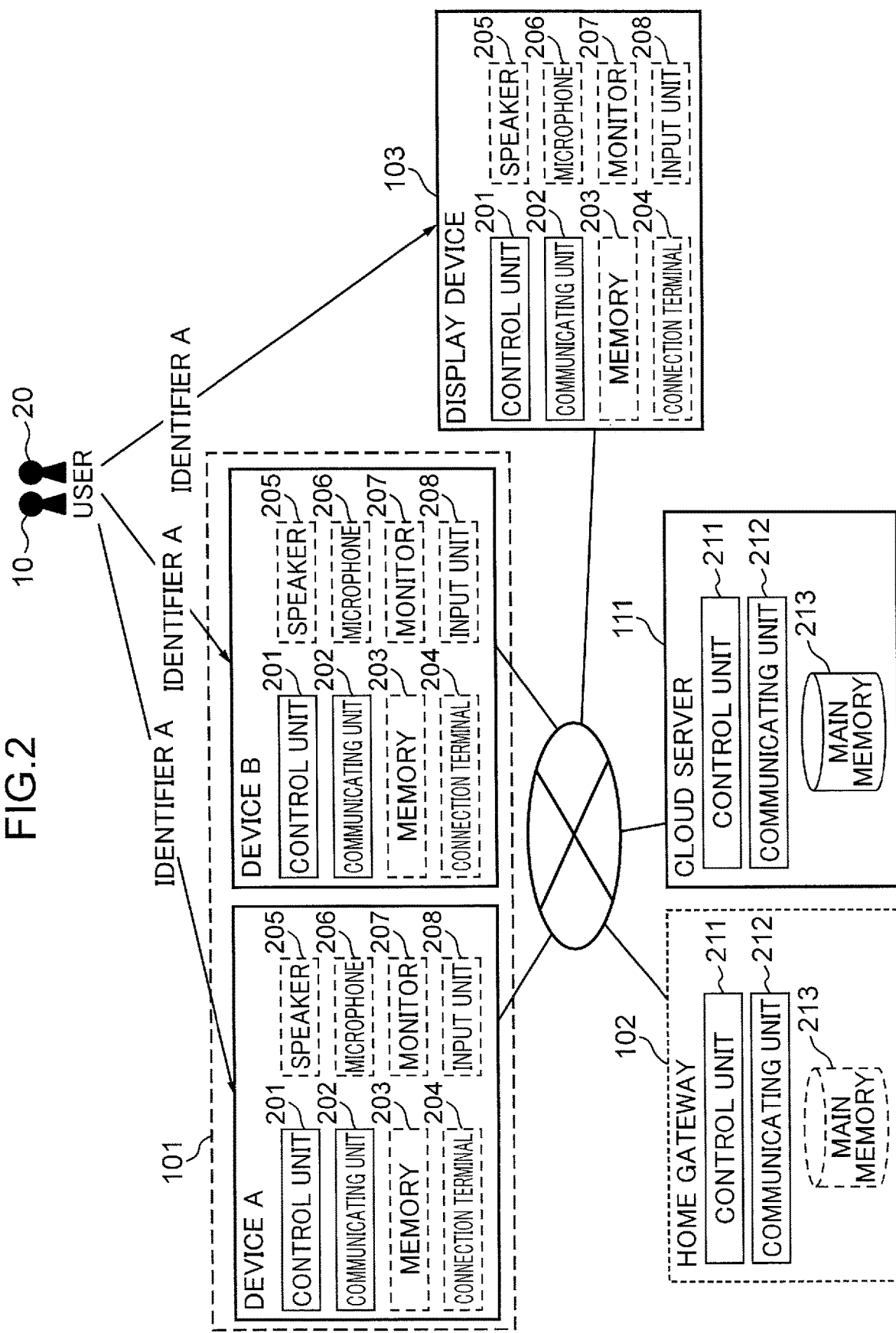

FIG. 6

2012/12/5, A, TELEVISION, XXXX, T-XXXXWT, 1 — 501

FIG. 7

2012/12/5, A, AIR CONDITIONER, YYYY, CS-XXXX, 0 — 502

FIG. 8

| | | |
|---|---|---|
| IDENTIFIER A | | |
| 2012/12/5 | TELEVISION, XXXX, T-XXXXWT | 1 |
| | AIR CONDITIONER, YYYY, CS-XXXX | 0 |
| | SMARTPHONE, YYYY, P-XXD | 0 |
| | PC, ZZZZ, XUXXX | 0 |
| 2012/12/10 | WASHING MACHINE, XXXX, NXXXXR | 1 |
| | REFRIGERATOR, XXYY, NXX57XV | 1 |
| IDENTIFIER B | ··· | |

```
IDENTIFIER A
2012/12/5   AIR CONDITIONER, YYYY, CS-XXXX    0
2012/12/5   SMARTPHONE, YYYY, P-XXD           0
2012/12/5   PC,ZZZZ,XUXXX                     0
////////////////////////////////////////////////
2012/12/5   TELEVISION, XXXX, T-XXXXWT        1
2012/12/10  WASHING MACHINE, XXXX, NXXXXR     1
2012/12/10  REFRIGERATOR, XXYY, NXX57XV       1
```
~504

FIG. 10

```
IDENTIFIER A
    AIR CONDITIONER, 0
    SMARTPHONE, 0
    PC,0
    TELEVISION, 1
    WASHING MACHINE, 1
    REFRIGERATOR, 1
```
~505

FIG.23

```
1000
GROUP 100 DEVICE A
2012/12/6 (THU)   06:32 POWER TURNED ON
                  06:32 AAAA              NEWS
                  07:33 BBBB              NEWS
                  08:01 POWER TURNED OFF
                  20:35 CCCC              VARIETY SHOW
                  21:02 DDDD              VARIETY SHOW
                  22:00 EEEE              DRAMA
                  23:05 FFFF              NEWS
                  23:45 POWER TURNED OFF

2012/12/7 (FRI)   06:33 POWER TURNED ON
                  06:33 AAAA              NEWS
                  07:25 BBBB              NEWS
                  08:03 POWER TURNED OFF
                  23:04 GGGG              VARIETY SHOW
                  23:55 HHHH              VARIETY SHOW

2012/12/8 (SAT)   01:05 POWER TURNED OFF
                  10:45 POWER TURNED ON
                  10:45 IIII              VARIETY SHOW
                  13:00 JJJJ              SPORTS
                  15:23 POWER TURNED OFF
                  23:05 KKKK              NEWS
                  23:55 POWER TURNED OFF
```

FIG.24

```
1001
GROUP 100 DEVICE A CLASSIFICATION
VARIETY SHOW 50%
NEWS 40%
DRAMA 5%
SPORTS 5%
PATTERN C
```

1011

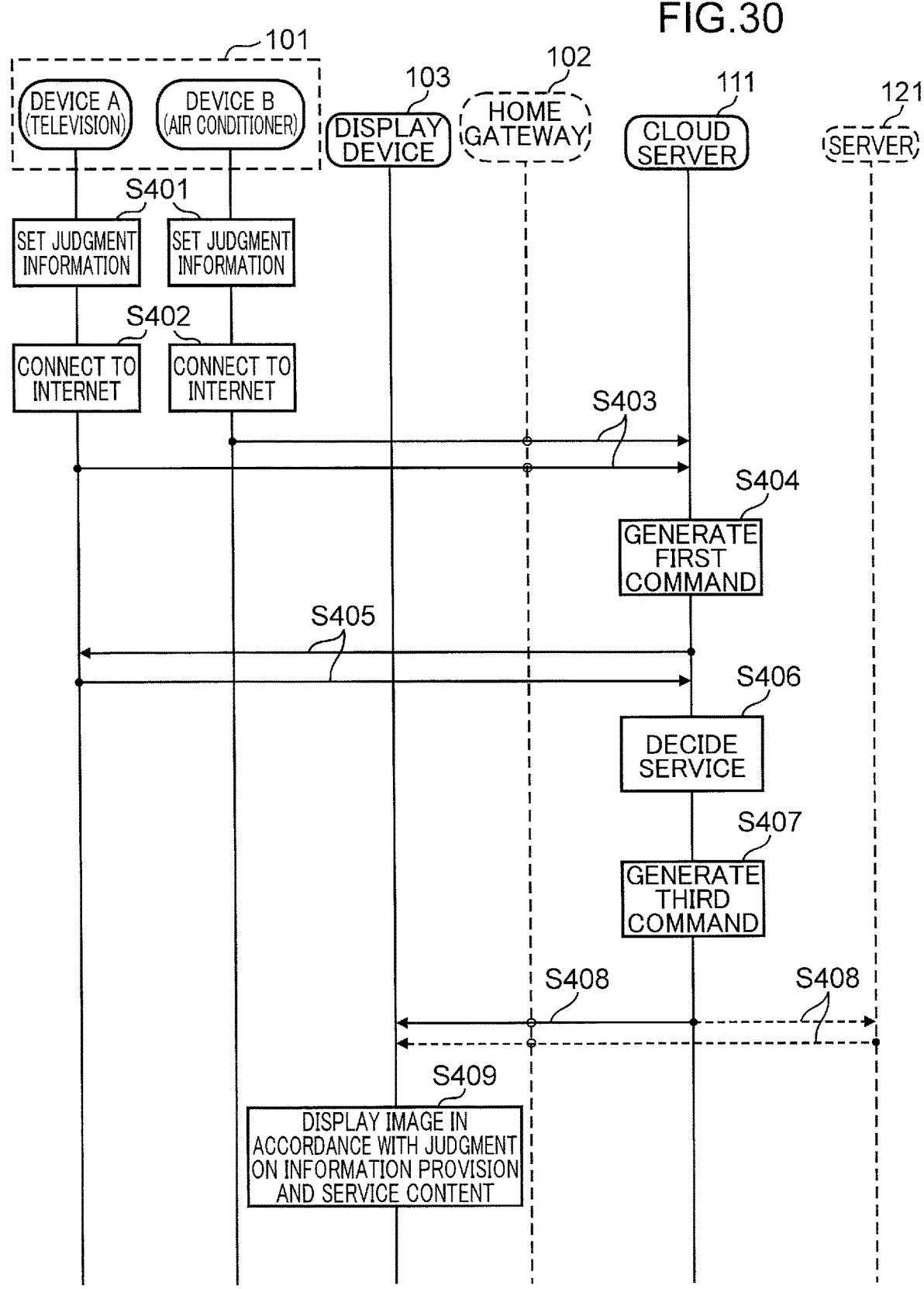

FIG.31

| OBJECT DEVICES PROMPTED TO PROVIDE INFORMATION | DEVICES ALREADY PROVIDING INFORMATION | SERVICE CONTENT | DETAILS REGARDING SERVICE (FOR DEC. 2012) |
|---|---|---|---|
| SMARTPHONE | TELEVISION | DISTRIBUTION OF TICKETS | PATTERN A: SOCCER GAME TICKETS/500 YEN<br>PATTERN B: MOVIE TICKETS/500 YEN<br>PATTERN C: TICKETS FOR STAND-UP COMEDY/500 YEN |
| SMARTPHONE | REFRIGERATOR | DISTRIBUTION OF STORE COUPONS | FOOD LIKELY TO RUN OUT: EGGS→COUPON FOR XX SUPERMARKET<br>FOOD LIKELY TO RUN OUT: MILK→COUPON FOR YY SUPERMARKET<br>FOOD LIKELY TO RUN OUT: CARROTS→COUPON FOR ZZ GROCERY |
| AIR CONDITIONER | TELEVISION | PROVISION OF OPERATING SERVICE CONFORMING TO LIFESTYLE | LIFESTYLE A: OPERATING MODE A<br>LIFESTYLE B: OPERATING MODE B<br>LIFESTYLE C: OPERATING MODE C |

| TELEVISION | YOUR VIEWING PATTERN: C | REFRIGERATOR | FOOD LIKELY TO RUN OUT: EGGS |

VIEWING RATIO

| A | B | C | D | E |

VIEWING TYPE  A···SPORTS
B···VARIETY SHOW
C···DRAMA
D···NEWS
E···OTHER

AVERAGE NUMBER OF TIMES
REFRIGERATOR WAS OPENED/CLOSED: 12
STOCK STATUS
 REFRIGERATOR
 MILK (2)
 EGGS (1)
  ⋮
 VEGETABLE COMPARTMENT
 CARROTS (3)
 ONIONS (4)

FIG.34

| TELEVISION | YOUR LIFESTYLE:C (STANDARD: ADULT TYPE)

AVERAGE START TIME OF VIEWING:

MONDAY 6:25
TUESDAY 6:28
WEDNESDAY 6:35
THURSDAY 6:32
FRIDAY 6:42
SATURDAY 10:53
SUNDAY 10:38

AVERAGE FINISH TIME OF VIEWING:

MONDAY 23:05
TUESDAY 23:55
WEDNESDAY 24:15
THURSDAY 23:32
FRIDAY 23:42
SATURDAY 24:05
SUNDAY 23:18

THE AIR CONDITIONER OPERATING SERVICE THAT YOU WILL RECEIVE···
WILL TURN ON THE AIR CONDITIONER FROM 6:00 TO 6:30 FROM
MONDAY TO FRIDAY DURING SUMMER
···LET YOUR AIR CONDITIONER AWAKE YOU COMFORTABLY.

INFORMATION MANAGEMENT METHOD, CONTROL SYSTEM, AND METHOD FOR CONTROLLING DISPLAY DEVICE

TECHNICAL FIELD

The present invention relates to an information management method, a control system, and a display device control method.

BACKGROUND ART

Conventionally, there are systems that enable a plurality of devices in the home to be searched and operated using the Internet. With such systems, leakage of personal information due to unauthorized access must be prevented. For example, Patent Literature 1 discloses a technique for reducing information leakage due to unauthorized access by setting, in advance, devices whose device information is to be disclosed to the outside and devices whose device information is not to be disclosed to the outside.

However, systems that acquire log information regarding usage from household devices and provide services based on the log information require further examination in order to improve information management.

CITATION LIST

Patent Literature

Patent Literature 1: Japanese Patent Application Laid-open No. 2001-060972

SUMMARY OF INVENTION

In order to solve the problem described above, an information management method according to an aspect of the present disclosure is an information management method in a control system that collects log information relating to usage of a plurality of devices associated with a same identifier from the plurality of devices via a network, the information management method including: receiving judgment information indicating whether or not the log information is to be provided to a service operator from each of the plurality of devices; and providing a command for causing a first image, which represents a device indicated by the judgment information as a device that provides the log information to a service operator, and a second image, which represents a device indicated by the judgment information as a device that does not provide the log information to a service operator, to be displayed in display modes that differ from each other to a display device associated with the identifier in response to an access by the display device.

Accordingly, information management in the control system can be improved.

BRIEF DESCRIPTION OF DRAWINGS

FIG. 1A is a diagram showing an overview of a service provided by a control system according to a present embodiment, FIG. 1B is a diagram showing an example where a device manufacturer corresponds to a data center operating company, and FIG. 1C is a diagram showing an example where both or one of a device manufacturer and a management company correspond to a data center operating company.

FIG. 2 is a diagram showing a configuration of the respective devices shown in FIG. 1.

FIG. 6 is a diagram showing an example of information received by a cloud server from a device A among a plurality of devices in step S103 shown in FIG. 5.

FIG. 7 is a diagram showing an example of information received by the cloud server from a device B among the plurality of devices in step S103 shown in FIG. 5.

FIG. 8 is a diagram showing an example of information organized by a cloud server.

FIG. 9 is a diagram showing an example of a command that is generated by a cloud server.

FIG. 10 is a diagram showing an example of another command that is generated by a cloud server.

FIG. 23 is a diagram showing an example of log information acquired from a device A.

FIG. 24 is a diagram showing an example of information that is generated based on log information by a cloud server.

FIG. 30 is a sequence diagram for illustrating a specific operation example of the control system according to the present third embodiment.

FIG. 31 is a diagram showing an example of a table for deciding a service.

FIG. 33 is a diagram showing an example of a screen for displaying log information acquired from a television and a refrigerator when deciding a service to be provided when provision of log information of a smartphone is allowed.

FIG. 34 is a diagram showing an example of a screen for displaying log information acquired from a television when deciding a service to be provided when provision of log information of an air conditioner is allowed.

Figure 3:
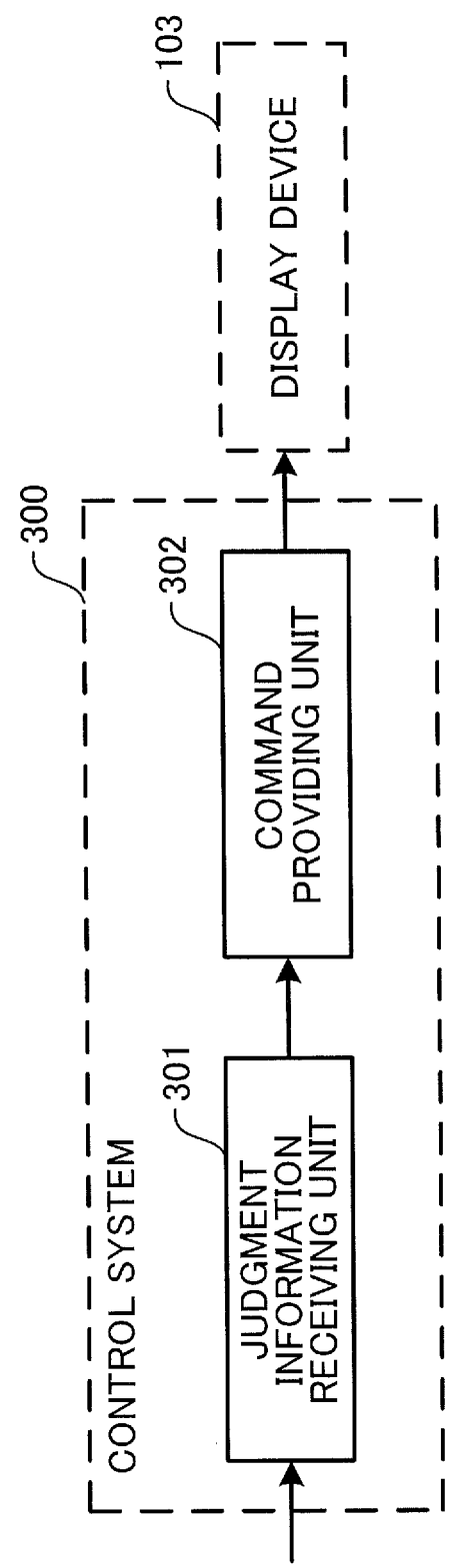
FIG. 3 is a diagram showing a configuration of a control system according to a present first embodiment.

DESCRIPTION OF EMBODIMENTS (Findings on which the Present Invention is Based)

Recently, services are being considered which acquire log information regarding usage of devices, analyze the acquired log information, and provide feedback to a user. However, since log information relating to usage of devices has an aspect of information classified as personal information from the perspective of the user, providing log information is conceivably accompanied with psychological resistance. On the other hand, from the perspective of a service provider that provides services, log information regarding usage of devices is information that can conceivably be utilized in order to improve services to be provided.

Therefore, a system which promotes provision of log information regarding usage of devices while reducing psychological resistance of the user must be developed.

The technique according to Patent Literature 1 simply involves setting, in advance, electronic devices whose device information is to be disclosed to the outside and electronic devices whose device information is not to be disclosed to the outside. Therefore, Patent Literature 1 does not consider means for readily confirming which electronic device has already been set to as to disclose device information to the outside and which electronic device has already been set to as not to disclose device information to the outside when changing set contents or newly adding an electronic device after setting whether or not device information is to be disclosed to the outside.

As a result, with the conventional art, it is conceivable that set contents cannot be readily and correctly confirmed and cannot be revised when, after setting whether or not device information is to be disclosed to the outside, the set contents do not meet the intentions of the user or the number of registered settings increases due to an increase in household electrical appliances.

In addition, for example, from the perspective of the user, there may be cases where the user wishes to change settings of a device whose device information has already been set so as not to be disclosed to the outside so as to disclose the device information to the outside. On the other hand, from the service provider, there may be cases where the service provider wishes to prompt changing of settings of a device whose device information has already been set so as not to be disclosed to the outside so as to disclose the device information to the outside. Such cases are not considered in Patent Literature 1.

In order to solve such problems, the present inventors have arrived at the invention according to the aspects described below.

An information management method according to an aspect of the present disclosure is an information management method in a control system that collects log information relating to usage of a plurality of devices associated with a same identifier from the plurality of devices via a network, the information management method including the steps of: receiving judgment information indicating whether or not the log information is to be provided to a service operator from each of the plurality of devices; and providing a command for causing a first image, which represents a device indicated by the judgment information as a device that provides the log information to a service operator, and a second image, which represents a device indicated by the judgment information as a device that does not provide the log information to a service operator, to be displayed in display modes that differ from each another to a display device associated with the identifier in response to an access by the display device.

Accordingly, the user can readily recognize devices which provide log information and devices which do not provide log information among a plurality of devices in a group such as the home. In order to confirm set contents of each device, the user need not confirm an operating interface of each device. In other words, an extra operation involving an operation for confirming set contents can be eliminated.

Furthermore, a second image representing a device indicated by judgment information that log information is not to be provided to a service operator is displayed in addition to a first image representing a device indicated by the judgment information that log information is to be provided to the service operator. Therefore, the user can be prompted to change set contents of a device whose device information has already been set so as not to be disclosed to the service operator so as to disclose the device information to the service operator.

In addition, an information management method according to another aspect of the present disclosure is an information management method in a control system that collects log information relating to usage of a plurality of devices associated with a same identifier from the plurality of devices via a network, the information management method including the steps of: receiving judgment information indicating whether or not the log information is to be provided to a service operator from each of the plurality of devices; and providing a command for displaying a first image, which represents a device indicated by the judgment information as a device that provides the log information to a service operator, and a second image, which represents a device indicated by the judgment information as a device that does not provide the log information to a service operator, in display modes that differ from each other on a display device associated with the identifier.

Furthermore, an information management method according to another aspect of the present disclosure is an information management method in a control system that collects log information relating to usage of a plurality of devices associated with a same identifier from the plurality of devices via a network, the information management method including the steps of: receiving judgment information indicating whether or not the log information is to be provided to a service operator from each of the plurality of devices; and providing a display screen that displays a first image, which represents a device indicated by the judgment information as a device that provides the log information to a service operator, and a second image, which represents a device indicated by the judgment information as a device that does not provide the log information to a service operator, in display modes that differ from each other to a display device associated with the identifier in response to an access by the display device.

Moreover, in the aspect described above, the command may be generated.

Moreover, in the aspect described above, the information management method may further include displaying the first image and the second image on the display device in display modes that differ from one another.

Moreover, in the aspect described above, the display modes may involve differentiating brightness of the first image and brightness of the second image from each other.

Moreover, in the aspect described above, the display modes may involve differentiating a size of the first image and a size of the second image from each other.

Moreover, in the aspect described above, the information management method may further include receiving the log information from a device indicated as a device that provides log information to a service operator, deciding priorities of devices, the log information on which is to be provided to a service operator among a plurality of devices indicated as devices that do not to provide log information to a service operator based on the received log information, and providing a command for causing the second image to be displayed to the display device according to the decided priorities.

Moreover, in the aspect described above, the plurality of second images may be displayed from top to bottom of a display screen of the display device or from left to right of the display screen of the display device in a descending order of the priorities.

Moreover, in the aspect described above, the information management method may further include receiving the log information from a device indicated as a device that provides log information to a service operator, deciding a service to be provided to the user when a device indicated as a device that does not provide log information to a service operator is indicated as a device that provides log information to the service operator based on the received log information, and providing a command for causing the decided service to be displayed to the display device.

Moreover, in the aspect described above, the devices indicated as devices that provide log information to a service operator may include a television, the log information may include a viewing history of the television, and the service may be decided based on a viewing trend that is obtained based on the viewing history.

Moreover, in the aspect described above, the identifier may include a first identifier and a second identifier that differs from the first identifier, and the information management method may further include providing a command for causing information regarding a second device associated with the second identifier that is related to a first device which is associated with the first identifier and which is indicated as a device that provides log information to a service operator to be displayed.

Moreover, in the aspect described above, a model number of the first device and a model number of the second device may be the same, and the information regarding the second device may be the number of the second devices.

In addition, a control system according to another aspect of the present invention is a control system that collects log information relating to usage of a plurality of devices associated with a same identifier from the plurality of devices via a network, the control system including: a judgment information receiving unit which receives judgment information indicating whether or not the log information is to be provided to a service operator from each of the plurality of devices; and a command providing unit which provides a command for causing a first image, which represents a device indicated by the judgment information as a device that provides the log information to a service operator, and a second image, which represents a device indicated by the judgment information as a device that does not provide the log information to a service operator, to be displayed in display modes that differ from one another to a display device associated with the identifier in response to an access by the display device.

Furthermore, a control system according to another aspect of the present invention is a control system that collects log information relating to usage of a plurality of devices associated with a same identifier from the plurality of devices via a network, the control system including: a judgment information receiving unit which receives judgment information indicating whether or not the log information is to be provided to a service operator from each of the plurality of devices; and a command providing unit which provides a command for causing a first image, which represents a device indicated by the judgment information as a device that provides the log information to a service operator, and a second image, which represents a device indicated by the judgment information as a device that does not provide the log information to a service operator, to be displayed in display modes that differ from each other on a display device associated with the identifier.

In addition, a control system according to another aspect of the present invention is a control system that collects log information relating to usage of a plurality of devices associated with a same identifier from the plurality of devices via a network, the control system including: a judgment information receiving unit which receives judgment information indicating whether or not the log information is to be provided to a service operator from each of the plurality of devices; and a command providing unit which provides a display screen that displays a first image representing a device indicated by the judgment information as a device that provides the log information to a service operator and a second image representing a device indicated by the judgment information as a device that does not provide the log information to a service operator in display modes that differ from one another to a display device associated with the identifier in response to an access by the display device.

Furthermore, a display method according to another aspect of the present invention is a display method of displaying images regarding a plurality of devices connected to a server associated with a same identifier via a network on the display device in response to an access to the server, the display method including: receiving a command for causing a first image, which represents a device for which provision of log information to a service operator is allowed, and a second image, which represents a device for which provision of log information to a service operator is not allowed, to be displayed in display modes that differ from one another from the server; and displaying the first image in a first display mode based on the command and displaying the second image in a second display mode based on the command.

In addition, a display method according to another aspect of the present invention is a display method of displaying images regarding a plurality of devices connected to a server associated with a same identifier via a network on a display device associated with the identifier, the display method including: receiving a command for causing a first image, which represents a device for which provision of log information to a service operator is allowed, and a second image, which represents a device for which provision of log information to a service operator is not allowed, to be displayed in display modes that differ from one another from the server; and displaying the first image in a first display mode based on the command and displaying the second image in a second display mode based on the command.

In addition, a server according to another aspect of the present invention is a server in a control system that collects log information relating to usage of a plurality of devices associated with a same identifier from the plurality of devices via a network, the server including: a communicating unit which receives judgment information indicating whether or not the log information is to be provided to a service operator from each of the plurality of devices; and a control unit which provides a command for causing a first image, which represents a device indicated by the judgment information as a device that provides the log information to a service operator, and a second image, which represents a device indicated by the judgment information as a device that does not provide the log information to a service operator, to be displayed in display modes that differ from each other to a display device associated with the identifier in response to an access by the display device.

Furthermore, a server according to another aspect of the present invention is a server in a control system that collects log information relating to usage of a plurality of devices associated with a same identifier from the plurality of devices via a network, the server including: a communicating unit which receives judgment information indicating whether or not the log information is to be provided to a service operator from each of the plurality of devices; and a control unit which provides a command for causing a first image, which represents a device indicated by the judgment information as a device that provides the log information to a service operator, and a second image, which represents a device indicated by the judgment information as a device that does not provide the log information to a service operator, to be displayed in display modes that differ from one another on a display device associated with the identifier.

In addition, a server according to another aspect of the present invention is a server in a control system that collects log information relating to usage of a plurality of devices associated with a same identifier from the plurality of devices via a network, the server including: a communicating unit which receives judgment information indicating whether or not the log information is to be provided to a service operator from each of the plurality of devices; and a control unit which provides a screen that displays a first image representing a device indicated by the judgment information as a device that provides the log information to a service operator and a second image representing a device indicated by the judgment information as a device that does not provide the log information to a service operator in display modes that differ from one another to a display device associated with the identifier in response to an access by the display device.

Furthermore, a display device according to another aspect of the present invention is a display device that displays images regarding a plurality of devices connected to a server associated with a same identifier via a network on the display device in response to an access to the server, the display device including: a communicating unit which receives a command for causing a first image, which represents a device for which provision of log information to a service operator is allowed, and a second image, which represents a device for which provision of log information to a service operator is not allowed, to be displayed in display modes that differ from one another from the server; and a display unit which displays the first image in a first display mode based on the command and which displays the second image in a second display mode based on the command.

In addition, a display device according to another aspect of the present invention is a display device which displays images regarding a plurality of devices connected to a cloud server associated with a same identifier via a network and which is associated with the identifier, the display device including: a communicating unit which receives a command for causing a first image, which represents a device for which provision of log information to a service operator is allowed, and a second image, which represents a device for which provision of log information to a service operator is not allowed, to be displayed in display modes that differ from each other from the server; and a display unit which displays the first image in a first display mode based on the command and which displays the second image in a second display mode based on the command.

Furthermore, a display device control method according to another aspect of the present invention is a control method of a display device used in a control system that collects log information relating to usage of a plurality of devices associated with a same identifier from the plurality of devices via a network, the display device control method causing the display device to: accept an instruction for confirming management contents with respect to a server which manages information indicating devices, the log information on which is to be provided to a service operator, among the plurality of devices associated with the identifier and information indicating devices, the log information on which is not to be provided to the service operator, among the plurality of devices associated with the identifier; access the server based on the accepted instruction; receive a command for causing a first image, which represents a device indicated as a device that provides log information to the service operator among the plurality of devices associated with the identifier, and a second image, which represents a device indicated as a device that does not provide log information to the service operator among the plurality of devices associated with the identifier, to be displayed in display modes that differ from each other from the server in response to the access; and display the first image and the second image in display modes that differ from one another on a display screen based on the received command.

(Overview of Service to be Provided)

First, an overview of a service provided by an information management system according to the present embodiment will be described.

FIG. 1A is a diagram showing an overview of a service provided by a control system according to the present embodiment. The control system includes a group 100, a data center operating company 110, and a service provider 120.

The group 100 is, for example, a corporation, an organization, or a home and may be of any size. A plurality of devices 101 including a device A and a device B, a home gateway 102, and a display device 103 are included in the group 100. The plurality of devices 101 include devices capable of connecting to the Internet (for example, a smartphone, a personal computer (PC), and a television) and devices incapable of connecting to the Internet by themselves (for example, an illumination device, a washing machine, and a refrigerator). The plurality of devices 101 may include devices which are incapable of connecting to the Internet by themselves but become capable of connecting to the Internet via the home gateway 102. In addition, a user 10 uses the plurality of devices 101 in the group 100. The display device 103 is a device having a displaying function. Examples of the display device 103 include a smartphone, a personal computer, a tablet terminal, a mobile phone, a television, and a home controller that controls the respective devices arranged in the group 100.

The data center operating company 110 includes a cloud server 111. The cloud server 111 is a virtual server that links with various devices via the Internet. The cloud server 111 mainly manages huge data (big data) and the like which are difficult to handle using general database management tools or the like. The data center operating company 110 manages data, manages the cloud server 111, and operates a data center that carries out such management. Details of services provided by the data center operating company 110 will be described later.

In this case, the data center operating company 110 is not limited to companies that only manage data or only operate the cloud server 111. For example, as shown in FIG. 1B, when a device manufacturer responsible for developing and manufacturing a device among the plurality of devices 101 also manages data or manages the cloud server 111, the device manufacturer corresponds to the data center operating company 110. In addition, the data center operating company 110 is not limited to one company. For example, as shown in FIG. 1C, when a device manufacturer and another management company manage data or operate the cloud server 111 in cooperation or in a shared manner, both of or one of the device manufacturer and the other management company correspond to the data center operating company 110.

The service provider 120 includes a server 121. The server 121 as referred to herein may be of any scale and includes, for example, a memory in a personal PC. In addition, there may be cases where the service provider 120 does not include the server 121.

Moreover, in the service described above, the home gateway 102 is not essential. For example, the home gateway 102 is unnecessary in a case where the cloud server 111 performs all data management. In addition, there may be cases where there are no devices that are incapable of connecting to the Internet by themselves such as when all devices in the home are connected to the Internet.

Moreover, the display device 103 may a device among the plurality of devices 101.

Next, a flow of information in the service will be described.

First, the device A or the device B in the group 100 transmits respective pieces of log information to the cloud server 111 of the data center operating company 110. The cloud server 111 accumulates log information of the device A or the device B (an arrow 131 in FIG. 1A). In this case, log information is information indicating an operation state, an operation date/time, or the like of the plurality of devices 101. For example, while log information includes a viewing history of a television, video recording reservation information of a recorder, an operation date/time of a washing machine, an amount of laundry, an opening/closing time/date of a refrigerator, the number of times a refrigerator had been opened/closed, or the like, log information is not limited to these types of information and may include various types of information that can be acquired from various types of devices. Moreover, the log information may be directly provided by the plurality of devices 101 themselves to the cloud server 111 via the Internet. In addition, the log information may be temporarily accumulated at the home gateway 102 from the plurality of devices 101 and provided to the cloud server 111 by the home gateway 102.

Next, the cloud server 111 of the data center operating company 110 provides the accumulated log information to the service provider 120 in fixed units. In this case, the fixed unit may be a unit that can be provided by the data center operating company 110 to the service provider 120 by organizing accumulated information or a unit that is requested by the service provider 120. In addition, while information is to be provided in fixed units as described above, information need not necessarily be provided in fixed units and an amount of provided information may vary according to circumstances. When necessary, the log information is stored in a server 121 owned by the service provider 120 (an arrow 132 in FIG. 1A).

Subsequently, the service provider 120 organizes the log information into information matching a service to be provided to the user and provides the organized information to the user. The user to which the service is provided may be the user 10 of the plurality of devices 101 or an outside user 20. As for a method of providing a service to the users 10 and 20, for example, the service may be directly provided to the users 10 and 20 by the service provider 120 (arrows 133 and 134 in FIG. 1A). In addition, as for a method of providing a service to the user 10, for example, the service may be directly provided to the user 10 once again via the cloud server 111 of the data center operating company 110 (arrows 135 and 136 in FIG. 1A). Furthermore, the cloud server 111 of the data center operating company 110 may organize the log information into information matching the service to be provided to the user and provide the organized information to the service provider 120.

Moreover, the user 10 may differ from the user 20 or may be the same as the user 20.

Hereafter, since a same overview of a service is shared between the respective embodiments described below, the respective embodiments will be hereinafter described using the same reference numerals.

Moreover, all of the embodiments described below represent specific examples of the present invention. Numerical values, shapes, components, steps, and orders of steps described in the following embodiments represent examples and are not intended to limit the present invention. In addition, components not described in independent claims representing highest concepts among the components of the following embodiments are to be described as arbitrary components. Furthermore, respective contents of all embodiments can be combined with one another.

First Embodiment (Configuration of Respective Devices)

FIG. 2 is a diagram showing a configuration of the respective devices shown in FIG. 1. Moreover, the configuration of the respective devices shown in FIG. 2 represents an example, and the respective devices may have a configuration different from that shown in in FIG. 2 or may have a configuration that partly differs from that shown in FIG. 2.

In the present embodiment, since various devices in the group 100 are assumed as the plurality of devices 101, various configurations of the device A and the device B are conceivable. Hereinafter, an example of configurations of the respective devices will be shown based on the assumption that the device A is a device capable of connecting to the Internet by itself and the device B is a device incapable of connecting to the Internet by itself.

The device A includes a control unit 201, a communicating unit 202, a memory 203, a connection terminal 204, a speaker 205, a microphone 206, a monitor 207, and an input unit 208. Moreover, the device A need not include the memory 203, the connection terminal 204, the speaker 205, the microphone 206, the monitor 207, and the input unit 208.

The control unit 201 is a component for performing various control regarding the device A and is not limited to any particular configuration. For example, the control unit 201 is constituted by a CPU (Central Processing Unit).

The communicating unit 202 is a component for communicating with other devices via the Internet and is not limited to any particular configuration. For example, the communicating unit 202 is constituted by an antenna or a module for data communication. Any method may be used to connect to the Internet. Some devices are capable of accessing the Internet only in response to an instruction issued by the user. In addition, some devices automatically (periodically) access the Internet even if the user does not voluntarily issue a connection instruction.

The memory 203 is a component for accumulating information and is not limited to any particular configuration. The memory 203 is constituted by an electronic part, a chip, or the like which is built into the device and which has a recording function. When the device A includes connecting means to an external recording medium, the memory 203 includes the connecting means.

The connection terminal 204 is a terminal for connecting to external devices. A type, a connection standard, or the like of the connection terminal 204 is not limited.

The input unit 208 includes all components that are used by the user to input characters or the like such as a keyboard and a touch panel.

The speaker 205 outputs sound. The microphone 206 converts sound into an electric signal. The monitor 207 displays various information.

The configuration of the device B is similar to the configuration of the device A. However, since a device that is incapable of connecting to the Internet by itself is assumed as the device B, the device B need not include the communicating unit 202, the memory 203, the connection terminal 204, the speaker 205, the microphone 206, the monitor 207, and the input unit 208. The device B connects to the Internet by connecting to the home gateway 102 or another communication device using the connection terminal 204.

The configuration of the display device 103 is similar to the configuration of the device A or the device B. Moreover, while the display device 103 need not include the communicating unit 202, the display device 103 displays information acquired via the Internet by one method or another. In addition, the display device 103 need not include the memory 203, the connection terminal 204, the speaker 205, the microphone 206, and the input unit 208. Furthermore, as described earlier, if there is a device having a display function similar to that of the monitor 207 among the plurality of devices 101, the display device 103 need not be provided. In other words, the plurality of devices 101 in the group 100 (the device A or the device B including the monitor 207) may include the display device 103. In addition, the display device 103 may be an apparatus used by the user 20 outside of the group 100. Furthermore, the display device 103 may be a display-dedicated apparatus.

The cloud server 111 includes a control unit 211, a communicating unit 212, and a main memory 213. For example, the control unit 211 is constituted by a CPU (Central Processing Unit). When the control unit 211 is to perform multiprocessing, the control unit 211 may be constituted by a plurality of CPUs. The communicating unit 212 is a component for communicating with the plurality of devices 101 (the device A and the device B) via the Internet and any method may be used. The main memory 213 is a storage device capable of storing large capacity data (big data). In addition to the components described above, the cloud server 111 may include a bus line for carrying data to a plurality of locations, a BIOS (Basic Input Output System) on which is recorded a program that is executed by the CPU upon startup of the server, an I/O controller for connecting a storage device such as a hard disk drive or an optical disk drive, a display device, an input device, or the like. Furthermore, since the configuration of the server 121 is the same as the configuration of the cloud server 111, a description thereof will be omitted.

For example, the home gateway 102 includes the control unit 211, the communicating unit 212, and the main memory 213. Since the respective components of the home gateway 102 are similar to the respective components of the cloud server 111, a description thereof will be omitted. The home gateway 102 need not include the main memory 213.

In the present embodiment, the plurality of devices 101 (the device A and the device B) in the group 100 and the display device 103 are associated with one another by a same identifier A. Moreover, the respective devices need not be always associated with each other by the same identifier. There may be a state where association is made by the identifier A at one point and association made by an identifier other than the identifier A at another point. However, when implementing the system according to the present embodiment, it is assumed that the plurality of devices 101 and the display device 103 are associated with one another by the same identifier A. An identifier is unique to a specific user (for example, the user 10) or to a plurality of users (for example, the user 10 and the user 20). Methods of associating an identifier with a device are not limited. For example, every time the system is used, a state where the system is logged in using the identifier A can be created by having the user 10 input the identifier A using the input units 208 of the device A, the device B, and the display device 103 and having the control unit 201 recognize the identifier A. In addition, due to initial settings upon purchase (upon installation) of the device A, the device B, and the display device 103, a state may be created where the identifier A and the respective devices are always associated with one another.

(Configuration of the Control System)

FIG. 3 is a diagram showing a configuration of a control system 300 according to the present first embodiment.

The control system 300 includes a judgment information receiving unit 301 and a command providing unit 302.

The judgment information receiving unit 301 receives judgment information indicating whether or not log information is to be provided to a service operator from each of the plurality of devices 101. The judgment information receiving unit 301 outputs the received judgment information to the command providing unit 302. In this case, as described with reference to FIG. 1, information provision refers to providing log information of the device A or the device B to the cloud server 111 or the home gateway 102. Judgment information refers to information regarding whether collection of log information from the plurality of devices 101 is allowed or not.

In this case, the communicating unit 212 of the cloud server 111 owned by the data center operating company 110 may include the judgment information receiving unit 301. In addition, the communicating unit 212 of the server 121 owned by the service provider 120 may include the judgment information receiving unit 301. Furthermore, the communicating unit 212 of the home gateway 102 of the group 100 may include the judgment information receiving unit 301. The communicating unit 212 communicates with the communicating unit 202 via the Internet and receives judgment information transmitted by the plurality of devices 101.

Based on the judgment information received by the judgment information receiving unit 301, the command providing unit 302 provides a command for causing a first image, which represents a device indicated by the judgment information as a device that provides the log information to the service operator, and a second image, which represents a device indicated by the judgment information as a device that does not provide the log information to the service operator, to be displayed in display modes that differ from each other to the display device 103 associated with the identifier in response to an access by the display device 103.

In this case, the first image and the second image refer to images that evoke the devices. For example, the command may be information for generating an HTML format web page. Alternatively, the command may be information for generating an image to be displayed on the display device 103. Alternatively, the command may be an image to be displayed on the display device 103 itself In this case, the control unit 211 of the cloud server 111 owned by the data center operating company 110 may include the command providing unit 302. In addition, the control unit 211 of the server 121 owned by the service provider 120 may include the command providing unit 302.

Furthermore, the control unit 211 of the home gateway 102 of the group 100 may include the command providing unit 302.

Moreover, the control system 300 may further include a command generating unit. The command generating unit generates a command for causing a first image, which represents a device indicated by the judgment information as a device that provides the log information to the service operator, and a second image, which represents a device indicated by the judgment information as a device that does not provide the log information to the service operator, to be displayed in display modes that differ from one another.

(Description of Control Method of Control System)

Figure 4:
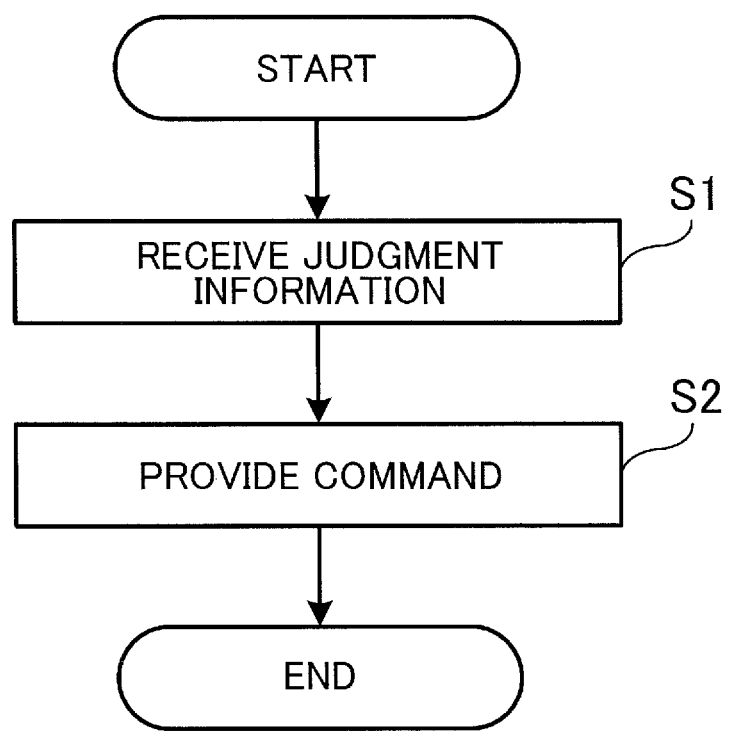
FIG. 4 is a flow chart showing a control method of the control system according to the present first embodiment.

FIG. 4 is a flow chart showing a control method of the control system 300 according to the present first embodiment.

First, the judgment information receiving unit 301 receives judgment information indicating whether or not log information is to be provided to a service operator from each of the plurality of devices 101 (step S1).

Next, the command providing unit 302 provides a command for displaying a first image representing a device indicated by the judgment information as a device that provides the log information to the service operator and a second image representing a device indicated by the judgment information as a device that does not provide the log information to the service operator in display modes that differ from one another to the display device 103 (step S2).

(Operation Example of the Control System)

Figure 5:
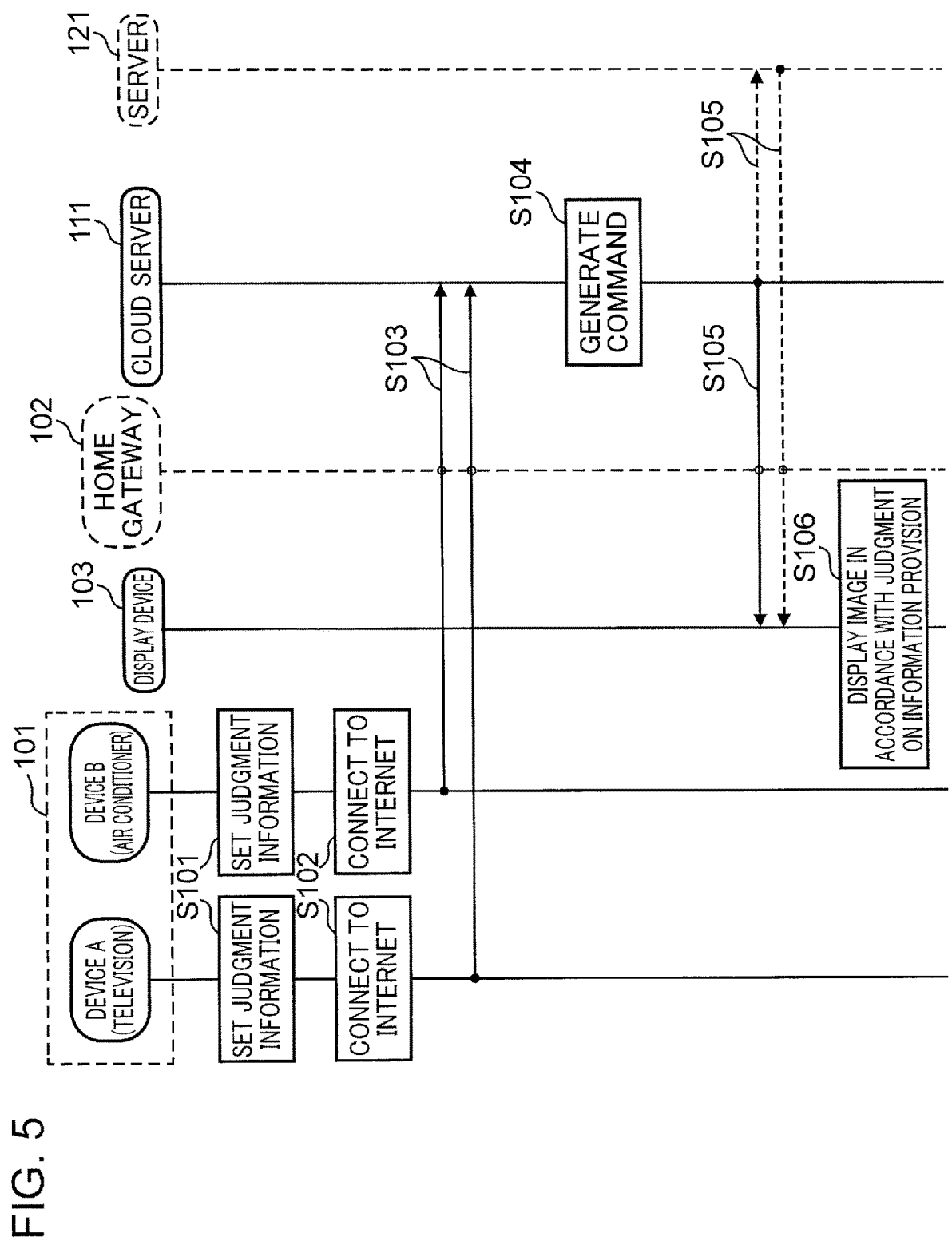
FIG. 5 is a sequence diagram for illustrating a specific operation example of the control system according to the present first embodiment.

Hereinafter, a more specific operation example of the control system according to the present first embodiment will be described with reference to FIG. 5. FIG. 5 is a sequence diagram for illustrating a specific operation example of the control system according to the present first embodiment. While a television is assumed as the device A and an air conditioner is assumed as the device B, these devices simply represent an example and are not intended to limit the present embodiment.

First, in step S101, the input unit 208 of each device accepts setting of judgment information by the user. As already described, judgment information refers to information regarding whether collection of log information from the plurality of devices 101 is allowed or not. In this case, with respect to the device A (television), judgment information is set which indicates that log information is to be collected, and with respect to judgment information of the device B, judgment information is set which indicates that log information is not to be collected.

Moreover, the user may set judgment information using the input unit 208 of the device A or the device B or the user may set judgment information with respect to the device A or the device B from a device other than the device A or the device B. In addition, the user may make an inquiry from any device to the device manufacturer or the data center operating company 110 and set the judgment information using the cloud server 111 or the like. While the device manufacturer may perform initial setting regarding judgment information, in the present embodiment, the user sets and changes the judgment information by any means after purchasing the device.

Next, in step S102, the communicating units 202 of the device A and the device B connect to the Internet. Methods of connecting to the Internet are as described earlier.

Next, in step S103, the communicating unit 212 of the cloud server 111 senses that the device A and the device B have connected to the Internet and receives judgment information regarding whether log information is set to be provided or whether log information is set not to be provided from each of the plurality of devices 101. In this case, the operation in step S103 corresponds to the operation of the judgment information receiving unit 301 in the control system 300 according to the present embodiment (the operation in step S1 in FIG. 4). Moreover, when the home gateway 102 is present, the communicating unit 212 of the cloud server 111 may sense that the devices have connected to the Internet via the home gateway 102.

As for a method of receiving judgment information, the device A or the device B of the plurality of devices 101 may be configured so as to notify judgment information to the cloud server 111 upon connection of the device A or the device B of the plurality of devices 101 to the Internet. In addition, the cloud server 111 may receive judgment information by requesting a notification indicating whether or not the device A or the device B has connected to the Internet at fixed intervals. Furthermore, the main memory 213 of the cloud server 111 may accumulate information regarding devices connected to the Internet. The cloud server 111 may receive judgment information of a new device that has not previously connected to the Internet among the plurality of devices 101 only when the new device connects to the Internet and may record information regarding the new device in the main memory 213.

FIG. 6 is a diagram showing an example of information 501 received by the cloud server 111 from the device A among the plurality of devices 101 in step S103 shown in FIG. 5. FIG. 7 is a diagram showing an example of information 502 received by the cloud server 111 from the device B among the plurality of devices 101 in step S103 shown in FIG. 5.

FIGS. 6 and 7 show acquired information organized in an order of a date (for example, "2012/12/5"), an identifier associated with the device (for example, "A"), a device type (for example, a "television" or an "air conditioner"), a manufacturer name (for example, "XXXX" or "YYYY"), a model number (for example, "T-XXXXWT" or "CS-XXXX"), and judgment information (for example, "0" or "1"). In this case, the received judgment information is represented by a flag of "0" or "1". A "0" flag indicates that log information is not to be provided and a "1" flag indicates that log information is to be provided. A flag may be generated by the control unit 201 of each device of the plurality of devices 101 or the cloud server 111 may convert received judgment information into a flag. In addition, information received by the cloud server 111 from the plurality of devices 101 in step S103 is not limited to the above. Information such as a model number is not necessarily essential.

Next, in step S104, the control unit 211 of the cloud server 111 organizes devices (the device A) set as devices that provide log information and devices (the device B) set as devices that do not provide log information among the devices (the device A and the device B) connected to the Internet and generates the command.

First, the control unit 211 of the cloud server 111 organizes information acquired from the respective devices in step S103 according to identifier. In addition, the control unit 211 of the cloud server 111 generates information 503 by organizing the information according to acquisition date. FIG. 8 is a diagram showing an example of the information 503 organized by the cloud server. In this case, as shown in FIG. 8, it is assumed that a smartphone, a PC, a washing machine, and a refrigerator are present in the group 100 in addition to the device A (television) and the device B (air conditioner) and that each device is connected to the Internet by some method or another. In FIG. 8, a date on which judgment information had been set, a device type, a manufacturer name, a model number, and judgment information are associated with an identifier.

By deciding a flag of each device, the control unit 211 organizes devices indicated by the judgment information that log information is not to be provided ("0" flag) and devices indicated by the judgment information that log information is to be provided ("1" flag) and generates a command 504 to be provided to the display device 103 associated with the identifier A. FIG. 9 is a diagram showing an example of the command 504 generated by the cloud server. Moreover, while the control unit 211 organizes devices according to flags representing judgment information after organizing according to date, a procedure of generating a command is not limited thereto. For example, the control unit 211 may organize devices according to flags representing judgment information to begin with without organizing according to acquisition date.

In addition, as shown in FIG. 10, the control unit 211 may generate a command 505 by organizing only device type and judgment information. FIG. 10 is a diagram showing an example of another command 505 that is generated by the cloud server. The command 505 includes a device type and judgment information.

Next, in step S105, the communicating unit 212 of the cloud server 111 provides the command 504 (or the command 505) for causing a first image, which represents a device indicated by the judgment information as a device that provides the log information, and a second image, which represents a device indicated by the judgment information as a device that does not provide the log information, to be displayed by the display device 103 in display modes that differ from one another to the display device 103 that is associated with the identifier A.

In this case, the operation in step S105 corresponds to the operation of the command providing unit 302 in the control system 300 according to the present embodiment (the operation in step S2 in FIG. 4). Moreover, depending on the type of business, the cloud server 111 may send the command 504 to the server 121 of the service provider 120 and the server 121 may provide the command 504 to the display device 103. Types of business will be described later. In addition, when the home gateway 102 is present, the cloud server 111 or the server 121 may provide the command 504 to the home gateway 102.

Next, in step S106, based on the command 504 provided by the cloud server 111, the display device 103 displays images representing the device A, the device B, and other devices among the plurality of devices 101 in modes corresponding to the judgment of information provision. More specifically, the display device 103 distinguishably displays a first image 601 related to a device set by the judgment information as a device that provides the log information and a second image 602 related to a device set by the judgment information as a device that does not provide the log information (refer to FIG. 11).

Figure 11:
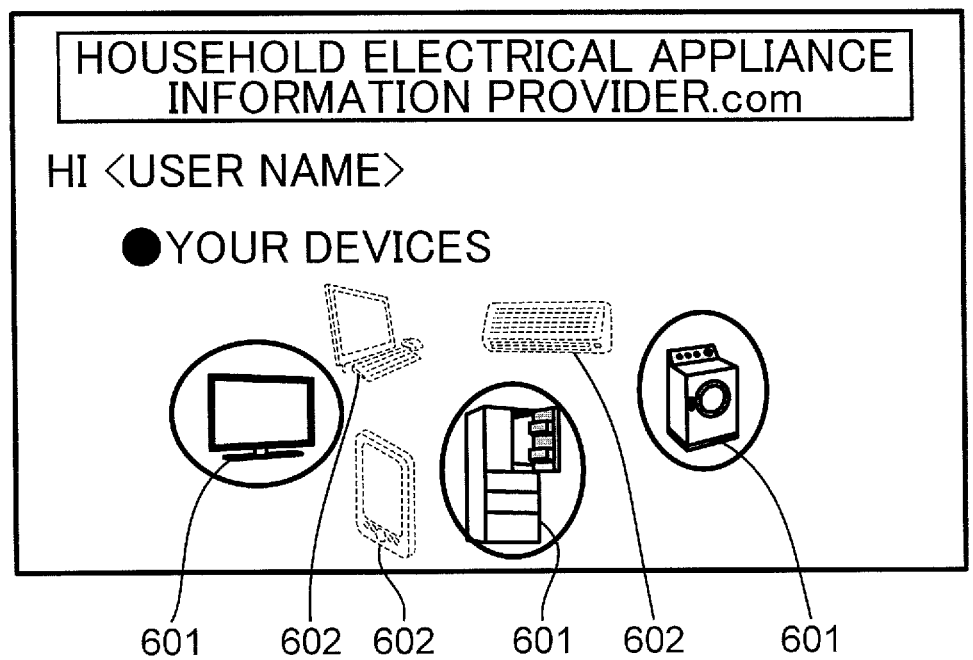
FIG. 11 is a diagram showing an example of a screen that is displayed on a display device according to the present first embodiment.

FIG. 11 is a diagram showing an example of a screen that is displayed on the display device 103 according to the present first embodiment. In the present first embodiment, a personal web page set up by the service provider 120 is used as a screen for displaying judgment information of each device. More specifically, a screen that displays judgment information of each device is displayed when the user 10 in the group 100 uses the display device 103 to access a web page set up by the service provider 120 and open a personal page (my page) by inputting an ID password or the like.

Moreover, a screen for displaying judgment information of each device on the display device 103 is not limited to a web page that is displayed by the user's access as shown in FIG. 11. For example, even if there is no user access, a device equipped with a display function among the plurality of devices 101 may automatically display and update a screen for displaying judgment information of each device.

In FIG. 11, images (icons) depicting all devices connected to the Internet in step S103 among the plurality of devices 101 in the group 100 are displayed. In addition, the display device 103 sets a brightness value of the first image 601 representing a device set by the judgment information as a device that provides the log information such as the device A (television), the refrigerator, and the washing machine among the plurality of devices 101 to be higher than a brightness value of the second image 602 representing a device set by the judgment information as a device that does not provide the log information such as the device B (air conditioner), the PC, and the smartphone among the plurality of devices 101. The display modes differentiate brightness of the first image 601 and brightness of the second image 602 from each other. Accordingly, the first image 601 is displayed brighter than the second image 602. Moreover, in FIG. 11, images with high brightness are depicted by solid lines and images with low brightness are depicted by dashed lines.

Furthermore, as shown in FIG. 11, the display device 103 may display the first image 601 representing a device set by the judgment information as a device that provides the log information by enclosing the first image 601 with a circle (or an ellipse) or the like. Accordingly, the first image 601 can be displayed highlighted. On the other hand, the display device 103 sets the brightness value of the second image 602 representing the device B (air conditioner), the PC, and the smartphone lower than the brightness value of the first image 601.

Alternatively, the display device 103 may set the brightness value of the first image 601 representing a device set as a device that provides the log information lower than the brightness value of the second image 602 representing a device set as a device that does not provide the log information. In other words, contrary to the example shown in FIG. 11, the display device 103 may set the brightness value of the second image 602 representing a device set by the judgment information as a device that does not provide the log information higher than the brightness value of the first image 601 representing a device set by the judgment information as a device that provides the log information. Furthermore, the display device 103 may display the second image 602 representing a device set by the judgment information as a device that does not provide the log information by enclosing the second image 602 with a circle (or an ellipse) or the like.

Figure 12:
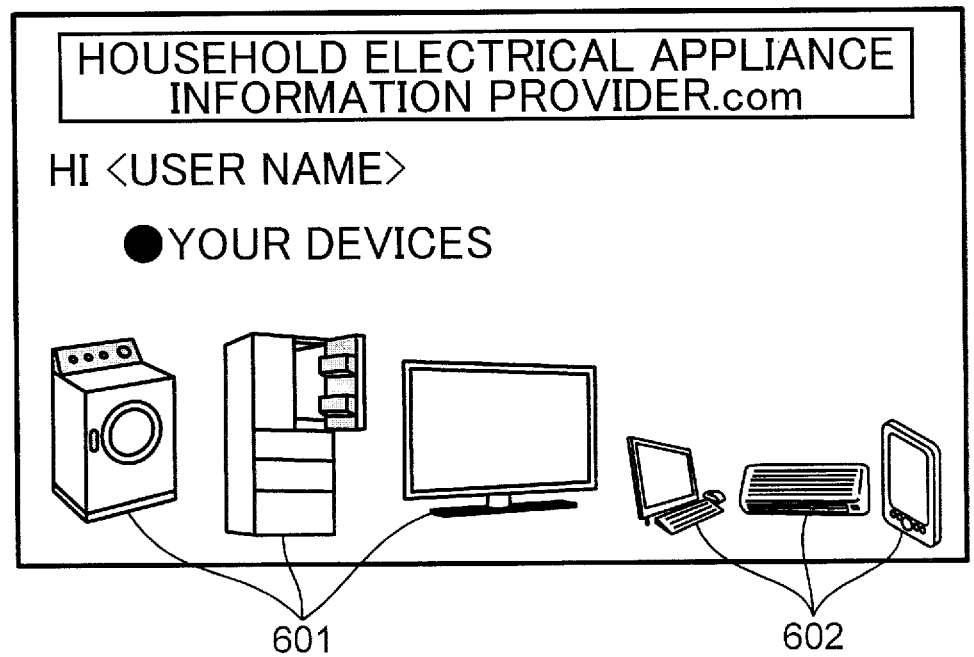
FIG. 12 is a diagram showing a first modification of a screen that is displayed on a display device according to the present first embodiment.

FIG. 12 is a diagram showing a first modification of a screen that is displayed on the display device 103 according to the present first embodiment. On the display screen shown in FIG. 12, in a similar manner to FIG. 11, a size of the first image 601 representing a device set by the judgment information as a device that provides the log information such as the device A (television), the refrigerator, and the washing machine among the plurality of devices 101 is displayed larger than a size of the second image 602 representing a device set by the judgment information as a device that does not provide the log information such as the device B (air conditioner), the PC, and the smartphone among the plurality of devices 101. In other words, the display device 103 differentiates the size of the first image 601 and the size of the second image 602 from each other when displaying the same.

Moreover, while the display device 103 displays a first image representing a device set by the judgment information as a device that provides the log information and a second image representing a device set by the judgment information as a device that does not provide the log information in display modes that differ from each other in the description given above, this arrangement is not restrictive. For example, the display device 103 may display an image representing a device owned by the user and an image representing a device not owned by the user in display modes that differ from each other. In the examples shown in FIGS. 11 and 12, images representing a television, a refrigerator, and a washing machine that are owned by the user are displayed as the first image 601 and images representing a PC, an air conditioner, and a smartphone that are not owned by the user are displayed as the second image 602.

Alternatively, the display device 103 may display images representing devices equipped with a function of acquiring log information among the devices owned by the user and images representing devices not equipped with a function of acquiring log information among the devices owned by the user in display modes that differ from each other. In the examples shown in FIGS. 11 and 12, images representing a television, a refrigerator, and a washing machine that are equipped with a function of acquiring log information among the devices owned by the user are displayed as the first image 601 and images representing a PC, an air conditioner, and a smartphone that are not equipped with a function of acquiring log information among the devices owned by the user are displayed as the second image 602.

Alternatively, when displaying an image representing a device owned by the user and an image representing a device not owned by the user in display modes that differ from each other, the display device 103 may display an advertisement that prompts the user to purchase the device not yet owned by the user. Moreover, in a similar manner, when displaying an image representing a device that is equipped with a function of acquiring log information and an image representing a device that is not equipped with a function of acquiring log information in display modes that differ from each other, the display device 103 may display an advertisement that prompts the user to purchase the device that is equipped with a function of acquiring log information. A display example thereof will be described with reference to FIG. 13.

Figure 13:
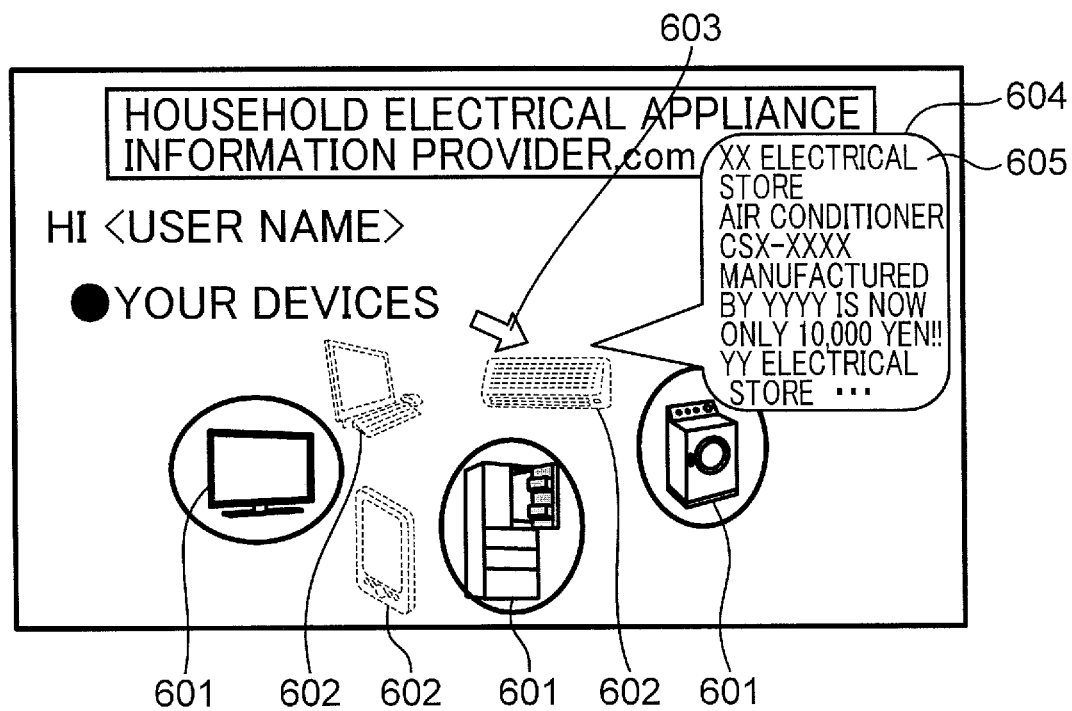
FIG. 13 is a diagram showing a second modification of a screen that is displayed on a display device according to the present first embodiment.

FIG. 13 is a diagram showing a second modification of a screen that is displayed on the display device 103 according to the present first embodiment.

For example, as shown in FIG. 13, when a mouse cursor 603 is moved by the user onto an image representing a device not owned by the user or a device that is not equipped with a function of acquiring log information, the display device 103 may display an advertisement image 604 prompting the user to purchase a device that is equipped with a function of acquiring log information. A store 605 that is displayed in the advertisement image 604 may be a retail outlet that sells directly to the user or a store that only provides a mail order service via the Internet. When the store 605 is clicked by the user, the display device 103 displays a web page of the store 605 or a web page illustrating a product. When the store 605 is a retail outlet that sells directly to the user, the display device 103 may display stores from top to bottom in a descending order of proximity from an address of the user. In addition, when the store 605 is a store that only provides a mail order service via the Internet, the display device 103 may display stores from top to bottom in a descending order of the amount of advertisement fees paid to the service provider 120.

Furthermore, the display device 103 may display a ratio of items of log information set by the user to be provided among all settable items of log information of the device as a degree of information provision.

Figure 14:
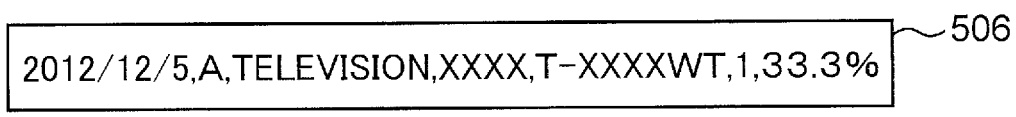
FIG. 14 is a diagram showing an example of information including a degree of information provision.

FIG. 14 is a diagram showing an example of information including a degree of information provision. As shown in FIG. 14, the judgment information receiving unit 301 may receive information 506. The information 506 is organized in an order of date (for example, "2012/12/5"), an identifier (for example, "A"), a device type (for example, a "television"), a manufacturer name (for example, "XXXX"), a model number (for example, "T-XXXXWT"), judgment information (for example, "1"), and a degree of information provision (for example, "33.3%"). When there are a plurality of items constituting log information to be provided, a degree of information provision refers to a ratio of items set to be provided among the plurality of items. For example, when the log information to be provided includes three items of "on/off time", "viewed genre", and "viewed program" and a user sets "on/off time" so as to be provided and sets "viewed genre" and "viewed program" so as not to be provided, the degree of information provision is specified as 33.3%.

Each of the plurality of devices 101 calculates a degree of information provision and transmits the calculated degree of information provision together with judgment information to the cloud server 111. The judgment information receiving unit 301 receives judgment information and a degree of information provision from each of the plurality of devices 101.

The control unit 211 of the cloud server 111 generates a command for causing the received degree of information provision to be displayed below the first image and the second image. Moreover, the control unit 211 of the cloud server 111 may generate a command for differentiating display modes of the first image and the second image which represent the respective devices from each other based on the received degrees of information provision. As for the display modes, for example, the higher the degree of information provision, the higher the set brightness of the first image and the second image, and the lower the degree of information provision, the lower the set brightness of the first image and the second image. A display example thereof will be described with reference to FIG. 15.

Figure 15:
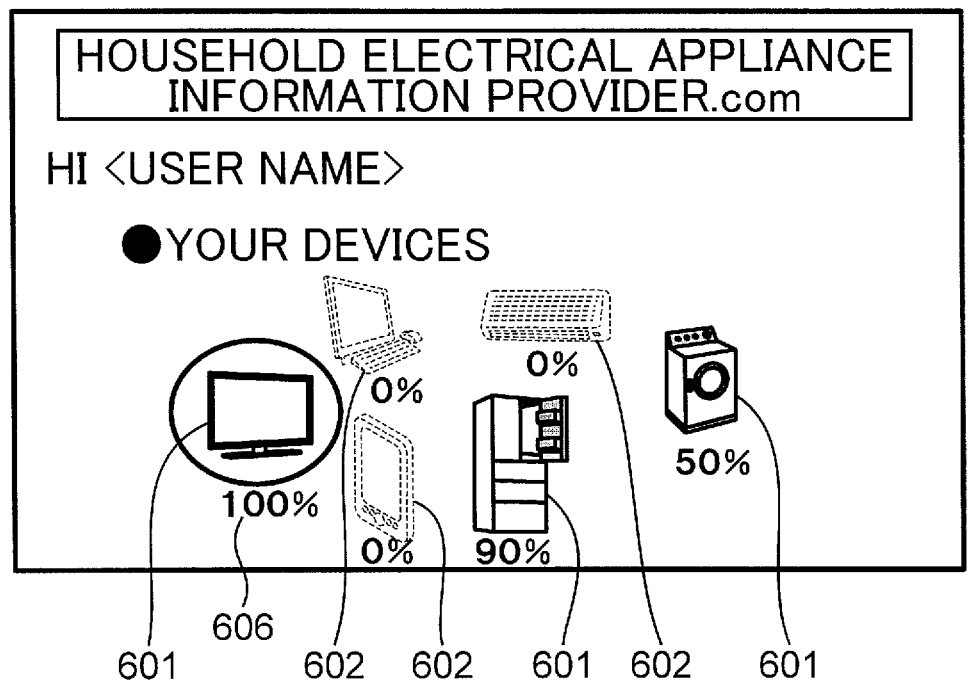
FIG. 15 is a diagram showing a third modification of a screen that is displayed on a display device according to the present first embodiment.

FIG. 15 is a diagram showing a third modification of a screen that is displayed on the display device 103 according to the present first embodiment. As shown in FIG. 15, the display device 103 displays respective degrees of information provision 606 below the first image 601 and the second image 602 representing each device. Moreover, in the display screen example shown in FIG. 15, display is performed so that the brightness of the first image 601 representing a device which provides log information is set higher than the brightness of the second image 602 representing a device which does not provide log information. In addition, the second image 602 shows a device which does not provide log information. Therefore, a degree of information provision 606 displayed below the second image 602 is displayed as 0%.

Moreover, while the display device 103 displays the first image 601 representing a device which provides log information and the second image 602 representing a device which does not provide log information in the present embodiment so that the brightness of the first image 601 and the brightness of the second image 602 differ from each other, the present invention is not limited thereto and the display device 103 may display the first image 601 representing a device which provides log information and the second image 602 representing a device which does not provide log information so that a color of the first image 601 and a color of the second image 602 differ from each other. In other words, for example, the display device 103 may display the first image 601 in blue and display the second image 602 in red.

In addition, the display device 103 may display the first image 601 representing a device which provides log information and the second image 602 representing a device which does not provide log information so that a display position of the first image 601 and a display position of the second image 602 differ from each other. In other words, the display device 103 may display the first image 601 in an upper part of the screen and display the second image 602 in a lower part of the screen.

Furthermore, when a plurality of devices of a same type are included in the group 100, the display device 103 may display the first image 601 and the second image 602 corresponding to each device so as to be identifiable. For example, when televisions are disposed in a plurality of rooms in the home, the display device 103 may display a room name in a lower part of the first image 601 or the second image 602 representing a television.

Moreover, while the display device 103 differentiates a display mode of devices which provides log information from a display mode of devices which do not provide log information in the respective embodiments described above, the display device 103 may further differentiate a display mode of devices connected to a network from a display mode of devices not connected to the network among devices capable of connecting to the network.

Figure 16:
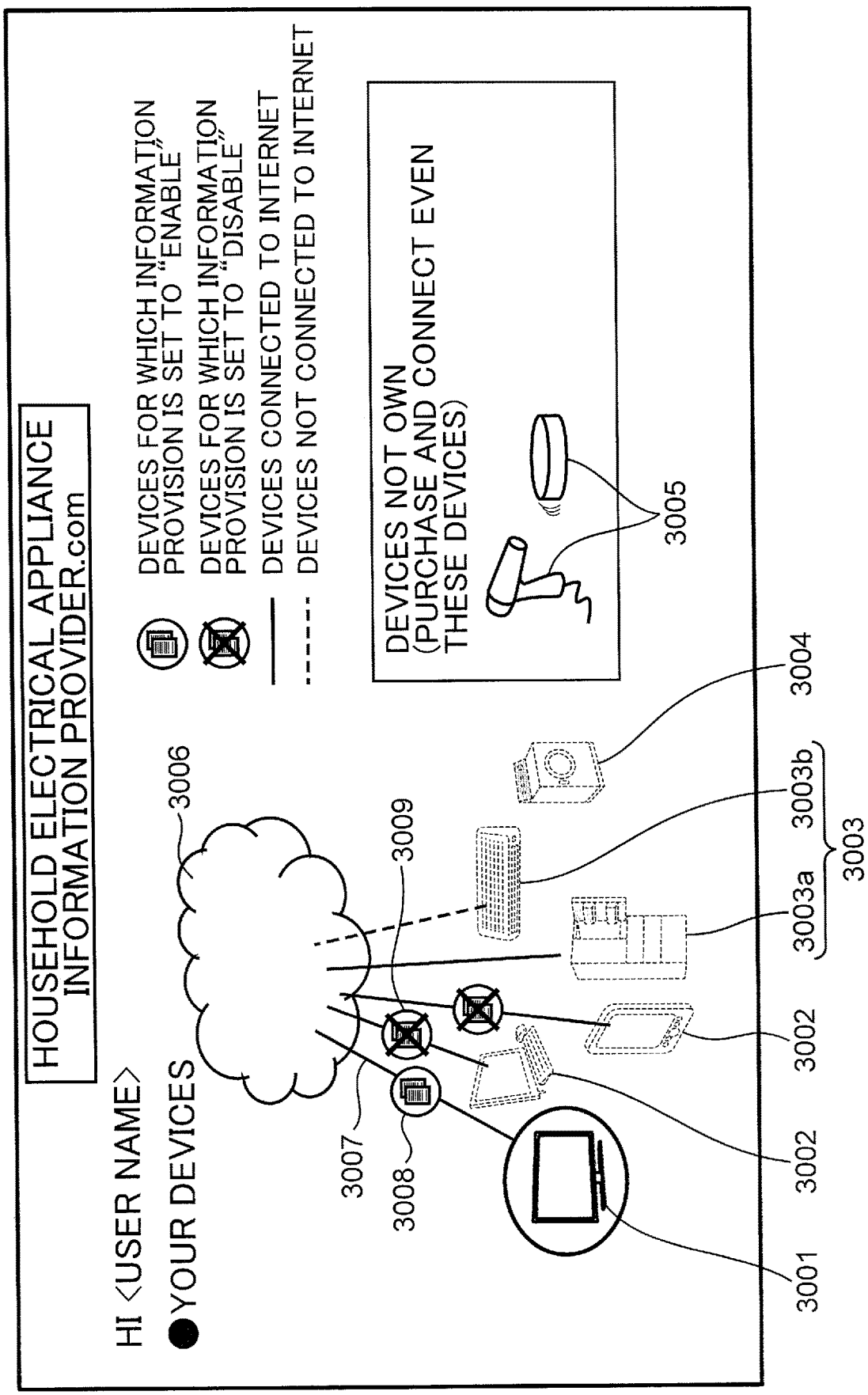
FIG. 16 is a diagram showing a fourth modification of a screen that is displayed on a display device according to the present first embodiment.

FIG. 16 is a diagram showing a fourth modification of a screen that is displayed on the display device 103 according to the present first embodiment.

In FIG. 16, images (icons) 3001 to 3004 depicting all devices owned by the user among the plurality of devices 101 in the group 100 are displayed. The display device 103 displays devices capable of connecting to the Internet and devices incapable of connecting to the Internet in display modes that differ from each other. As shown in FIG. 16, whether or not each device is capable of connecting to the Internet is expressed by a line image 3007 connecting the images 3001 to 3004 representing the devices with an image 3006 representing a network.

The plurality of devices 101 include devices capable of connecting to the Internet and devices incapable of connecting to the Internet. In the case of a device capable of connecting to the Internet, the line image 3007 connecting an image representing the device with an image 3006 representing the network is displayed, and in the case of a device incapable of connecting to the Internet, the line image 3007 is not displayed. In the example shown in FIG. 16, since the devices corresponding to the images 3001, 3002, and 3003 are capable of connecting to the Internet, the line images 3007 connecting the images 3001, 3002, and 3003 representing the respective devices and the image 3006 representing the network are displayed. Meanwhile, since the device corresponding to the image 3004 is incapable of connecting to the Internet, the line image 3007 connecting the image 3004 representing the device and the image 3006 representing the network is not displayed.

Accordingly, the user can readily confirm whether a device owned by the user is capable of connecting to the Internet.

Moreover, information regarding devices that are incapable of connecting to the Internet may be registered by the user in advance. In addition, when a device incapable of connecting to the Internet is inserted into a power plug, the home gateway 102 may acquire information regarding the device incapable of connecting to the Internet from the device via the power plug.

Furthermore, the display device 103 displays devices connected to the Internet and devices not connected to the Internet among devices capable of connecting to the Internet in display modes that differ from each other. As shown in FIG. 16, devices which are capable of connecting to the Internet and which are connected to the Internet are represented by the line image 3007 depicted by a solid line and devices which are capable of connecting to the Internet and which are not connected to the Internet are represented by the line image 3007 depicted by a dashed line.

Devices capable of connecting to the Internet include devices connected to the Internet and devices not connected to the Internet. Whether or not a device is to be connected to the Internet can be set for each device. In the case of a device which is capable of connecting to the Internet and which is connected to the Internet, the line image 3007 connecting an image representing the device and the image 3006 representing a network is displayed by a solid line. On the other hand, in the case of a device which is capable of connecting to the Internet and which is not connected to the Internet, the line image 3007 connecting an image representing the device and the image 3006 representing a network is displayed by a dashed line. In the example shown in FIG. 16, since the devices corresponding to the images 3001, 3002, and 3003a are connected to the Internet, the line images 3007 connecting the images 3001, 3002, and 3003a and the image 3006 representing the network are displayed by solid lines. Meanwhile, since the device corresponding to the image 3003b is not connected to the Internet, the line image 3007 connecting the image 3004 and the image 3006 representing the network is displayed by a dashed line.

Accordingly, the user can readily confirm whether or not a device capable of connecting to the Internet is actually being connected to the Internet.

Furthermore, the display device 103 displays devices which provides log information and devices which do not provide log information among devices connected to the Internet in display modes that differ from each other. The display device 103 sets a brightness value of the image 3001 representing a device which provides log information so as to be higher than a brightness value of the images 3002, 3003, and 3004 that represent devices which do not provide log information. Moreover, in FIG. 16, images with high brightness are depicted by solid lines and images with low brightness are depicted by dashed lines.

Alternatively, the display device 103 may set a size of the image 3001 representing a device which provides log information so as to be larger than a size of the images 3002, 3003, and 3004 that represent devices which do not provide log information.

In addition, the display device 103 may set a brightness value of the image 3001 representing a device which provides log information so as to be lower than a brightness value of the images 3002, 3003, and 3004 that represent devices which do not provide log information. In other words, contrary to the example shown in FIG. 16, the display device 103 may set the brightness value of the images 3002, 3003, and 3004 representing devices set by the judgment information as devices that do not provide the log information so as to be higher than the brightness value of the image 3001 representing a device set by the judgment information as a device that provides the log information.

Furthermore, the display device 103 may display an image 3008 indicating that a device is to provide log information and an image 3009 indicating that a device is not to provide log information on the line images 3007 connecting the images 3001 and 3002 representing the respective devices with the image 3006 representing a network.

In addition, the display device 103 may display the image 3005 representing a device which is not owned by the user and which is capable of connecting to the network. In the example shown in FIG. 16, the image 3005 representing a dryer and a cleaning robot is displayed as images representing devices which are not owned by the user and which are capable of connecting to the network. The cloud server 111 may store a list of devices capable of connecting to the network in advance. In this case, the cloud server 111 specifies devices other than those owned by the user among the devices included in the list as devices which are not owned by the user and which are capable of connecting to the network.

Accordingly, the user can be prompted to purchase a device capable of connecting to the network and log information can be acquired from even more devices.

In addition, on the display screen shown in FIG. 16, a message image corresponding to a state of each device may be displayed when a cursor is moved on an image representing each device.

Figure 17:
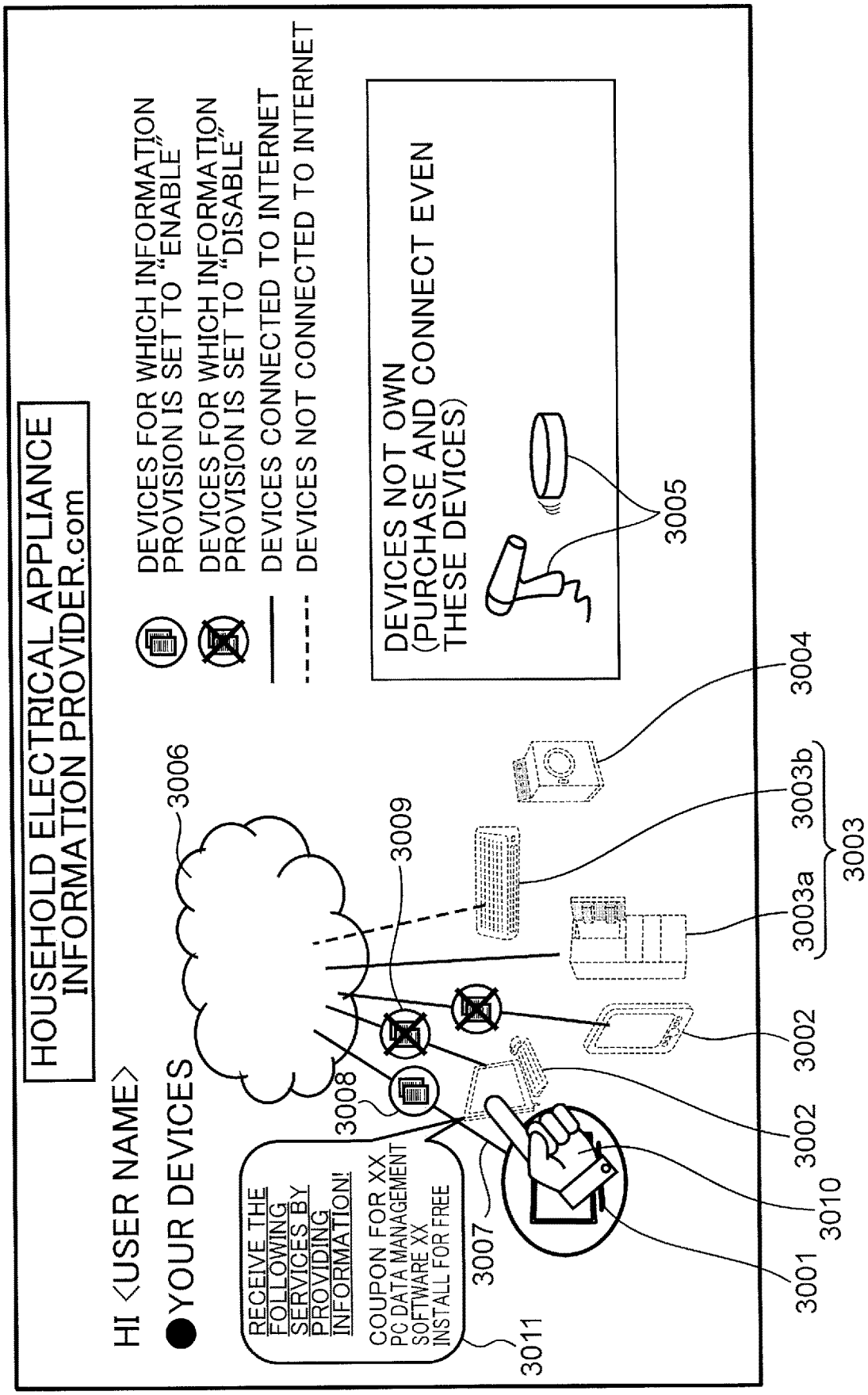
FIG. 17 is a diagram showing a screen that is displayed when a cursor is moved onto an image representing a device for which log information is set not to be provided on the display screen shown in FIG. 16.

FIG. 17 is a diagram showing a screen that is displayed when a cursor is moved onto an image representing a device for which log information is set not to be provided on the display screen shown in FIG. 16.

As shown in FIG. 17, when a mouse cursor 3010 is moved onto the image 3002 representing a device for which log information is set not to be provided by the user, the display device 103 may display a message image 3011 showing contents of a service to be provided to the user if provision of log information is to be allowed.

The message image 3011 displays a service that is rendered when log information is provided. Moreover, the message image 3011 may display a hypertext for jumping to a page that accepts changes to settings regarding the provision of log information.

Figure 18:
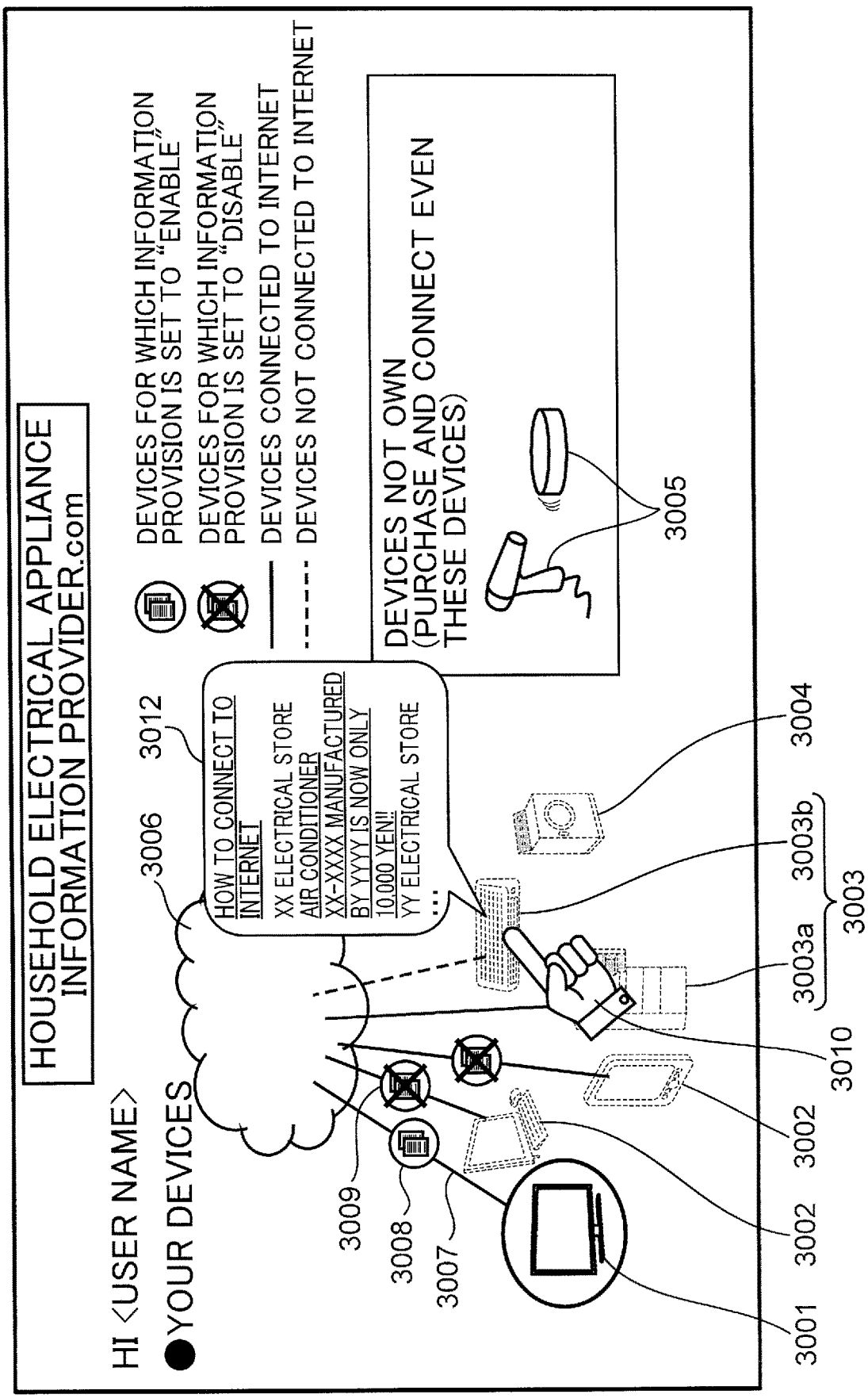
FIG. 18 is a diagram showing a screen that is displayed when a cursor is moved onto an image representing a device that is not connected to the Internet on the display screen shown in FIG. 16.

FIG. 18 is a diagram showing a screen that is displayed when a cursor is moved onto an image representing a device that is not connected to the Internet on the display screen shown in FIG. 16.

As shown in FIG. 18, when the mouse cursor 3010 is moved onto the image 3003b representing a device that is not connected to the Internet by the user, the display device 103 may display a message image 3012 for jumping to a page that enables an Internet connection to be set.

The message image 3012 displays a hypertext for jumping to a page that enables an Internet connection to be set. Alternatively, the message image 3012 may display an advertisement image that prompts the user to purchase a device equipped with a function for providing log information. Moreover, the advertisement image displayed in this case may be the same as the advertisement image 604 shown in FIG. 13.

Figure 19:
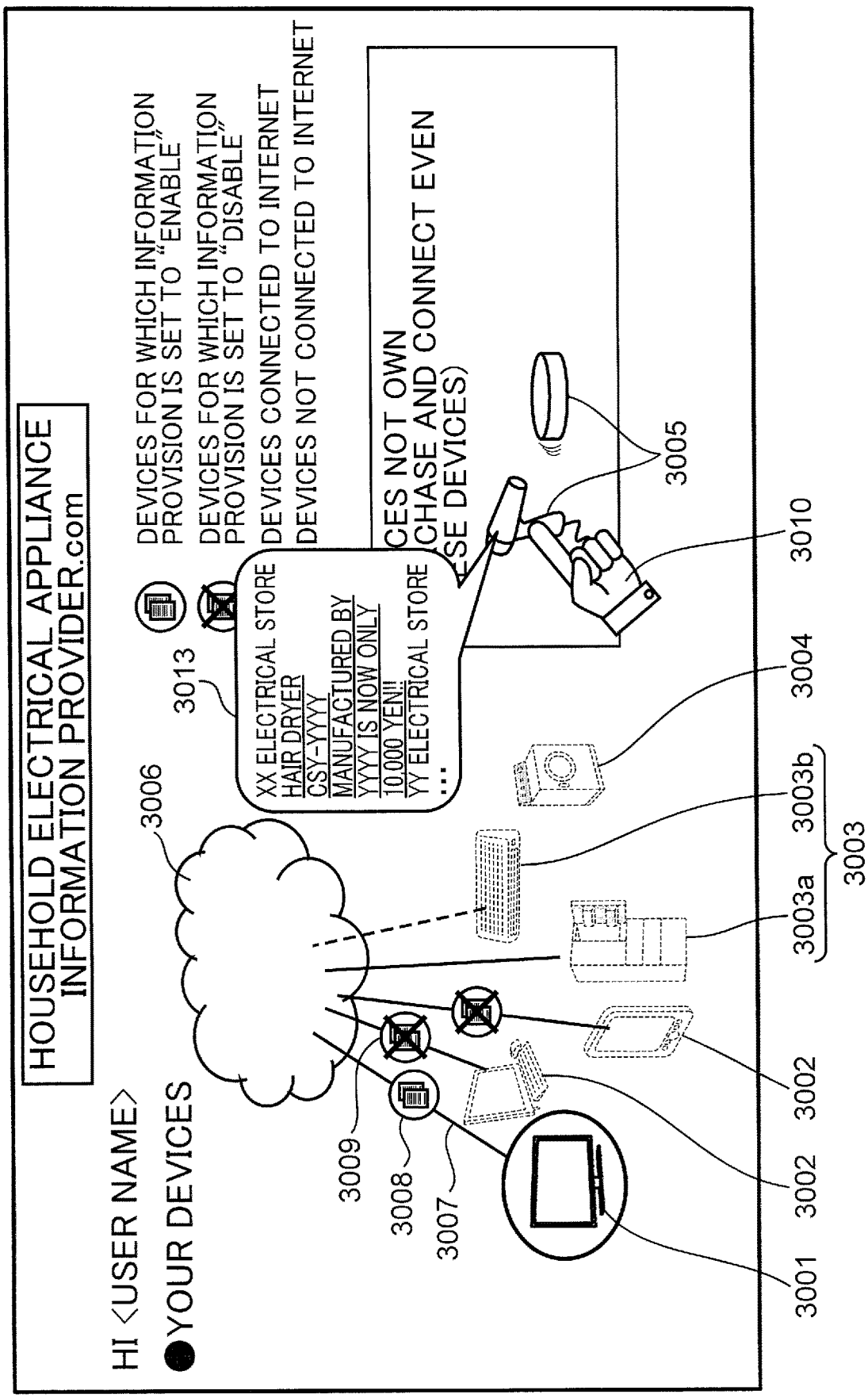
FIG. 19 is a diagram showing a screen that is displayed when a cursor is moved onto an image representing a device that is not owned by a user on the display screen shown in FIG. 16.

FIG. 19 is a diagram showing a screen that is displayed when a cursor is moved onto an image representing a device that is not owned by the user on the display screen shown in FIG. 16.

As shown in FIG. 19, when the mouse cursor 3010 is moved by the user onto the image 3005 representing a device that is not owned by the user, the display device 103 may display an advertisement image 3013 that prompts the user to purchase a device equipped with a function for providing log information. Moreover, the advertisement image 3013 displayed in this case may be the same as the advertisement image 604 shown in FIG. 13.

In addition, when the mouse cursor 3010 is moved by the user onto the image 3004 representing a device that is incapable of connecting to the Internet by the user, the display device 103 may display an advertisement image 3013 that prompts the user to purchase a device equipped with a function for providing log information.

As described above, according to the present first embodiment, devices set as devices that provide log information and devices set as devices that do not provide log information among devices connected to the Internet are specified and respectively displayed in display modes that differ from one another. Therefore, the user can readily recognize devices which provide log information and devices which do not provide log information among devices in a group such as the home. The user need not confirm an operation interface of each device in order to confirm set contents with respect to whether or not the log information of each device is to be provided. In other words, an extra operation involving an operation for confirming set contents with respect to each device can be eliminated. In addition, even if the number of household electrical appliances to be set increases, set contents can be confirmed in an easy and error-free manner.

Furthermore, in addition to an image representing a device indicated by judgment information that log information is to be provided, an image representing a device indicated by judgment information that log information is not to be provided is also displayed. Therefore, with respect to a device already set as a device that does not provide log information, the user can be prompted to change the setting as a device that provides log information.

Second Embodiment (Configuration of Respective Devices)

Since a configuration of the respective devices according to the present second embodiment is similar to that of the first embodiment, a description thereof will be omitted. Hereinafter, the same reference numerals as used in the first embodiment will be used.

(Configuration of the Control System)

Figure 20:
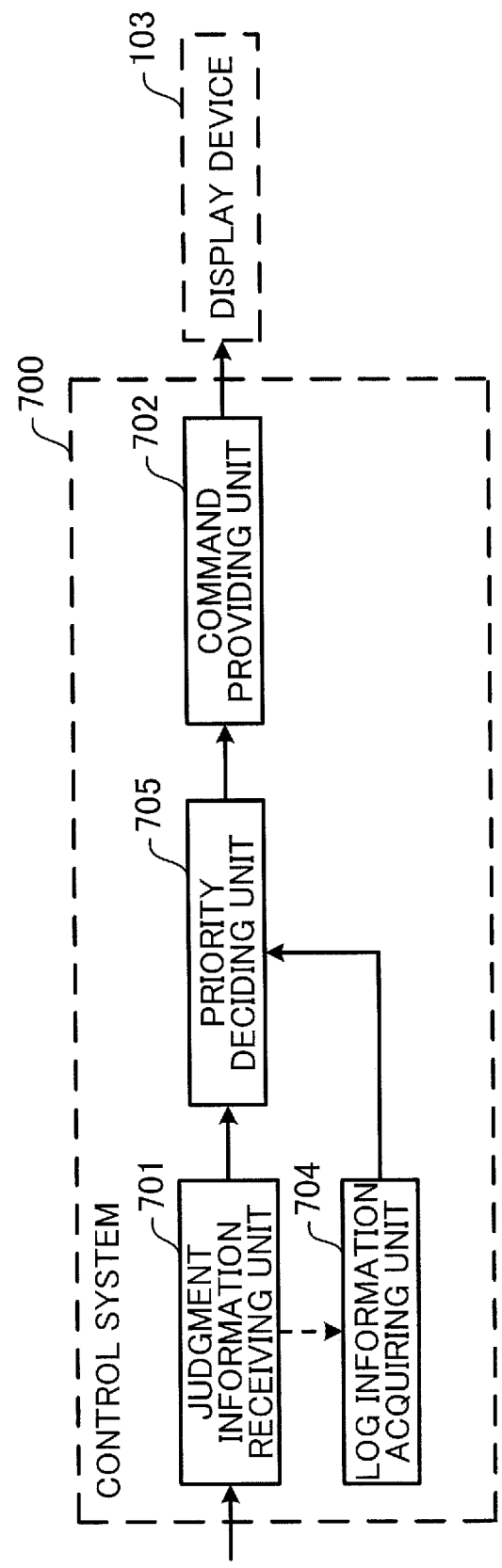
FIG. 20 is a diagram showing a configuration of a control system according to a present second embodiment.

FIG. 20 is a diagram showing a configuration of a control system 700 according to the present second embodiment.

The control system 700 includes a judgment information receiving unit 701, a command providing unit 702, a log information acquiring unit 704, and a priority deciding unit 705.

Since processes performed by the judgment information receiving unit 701 and the command providing unit 702 are similar to processes performed by the judgment information receiving unit 301 and the command providing unit 302 according to the first embodiment, a description thereof will be omitted.

The log information acquiring unit 704 acquires log information from a device indicated that log information is to be provided to a service operator. The log information acquiring unit 704 acquires log information from each device set as a device that provides log information among the plurality of devices 101 in the group 100 and outputs the log information to the priority deciding unit. Moreover, any method may be used to acquire log information. In addition, log information is as described in the first embodiment. Furthermore, the log information acquiring unit 704 may acquire judgment information of each device from the judgment information receiving unit 701 and may acquire log information from a device set as a device that provides log information based on the acquired judgment information.

In this case, the control unit 211 of the cloud server 111 owned by the data center operating company 110 may include the log information acquiring unit 704. In addition, the control unit 211 of the server 121 owned by the service provider 120 may include the log information acquiring unit 704. Furthermore, the control unit 211 of the home gateway 102 of the group 100 may include the log information acquiring unit 704. The control unit 211 controls the respective units via the communicating unit 212 and the communicating unit 202 in order to acquire log information of devices set so as devices that provide log information among the plurality of devices 101. Alternatively, the control unit 201 of the device A or the device B among the plurality of devices 101 may include the log information acquiring unit 704. In this case, the control unit 201 of each device acquires log information and outputs the log information to the priority deciding unit 705.

Based on the received log information, the priority deciding unit 705 decides a priority of devices which provides log information to the service operator among a plurality of devices indicated that log information is not to be provided to the service operator. Based on log information outputted by the log information acquiring unit 704 and information outputted by the judgment information receiving unit 701, the priority deciding unit 705 decides a priority of devices set as devices that do not provide log information. A priority is an order representing which device's log information is favorably preferentially provided when there are a plurality of devices set as devices that do not provide log information. In other words, the priority represents a priority of devices the log information on which is favorably provided among the plurality of devices set as devices that do not provide log information. Moreover, the priority deciding unit 705 need not necessarily decide the priority based on log information. For example, the priority deciding unit 705 may device the priority based solely on information outputted from the judgment information receiving unit 701.

In this case, the control unit 211 of the cloud server 111 owned by the data center operating company 110 may include the priority deciding unit 705. In addition, the control unit 211 of the server 121 owned by the service provider 120 may include the priority deciding unit 705. Furthermore, the control unit 211 of the home gateway 102 of the group 100 may include the priority deciding unit 705.

The command providing unit 702 provides the display device 103 with a first command for causing a first image, which represents a device indicated by judgment information that log information is to be provided, and a second image, which represents a device indicated by the judgment information as a device that does not provide the log information, to be displayed in display modes that differ from each other and a second command for causing the second image to be displayed in accordance with the priority decided by the priority deciding unit 705.

In this case, the control unit 211 of the cloud server 111 owned by the data center operating company 110 may include the command providing unit 702. In addition, the control unit 211 of the server 121 owned by the service provider 120 may include the command providing unit 702. Furthermore, the control unit 211 of the home gateway 102 of the group 100 may include the command providing unit 702.

Moreover, the control system 700 may further include a command generating unit. The command generating unit generates a first command for causing a first image, which represents a device indicated by judgment information that log information is to be provided, and a second image, which represents a device indicated by the judgment information as a device that does not provide the log information, to be displayed in display modes that differ from each other and a second command for causing the second image to be displayed in accordance with the priority decided by the priority deciding unit 705.

(Description of Control Method of Control System)

Figure 21:
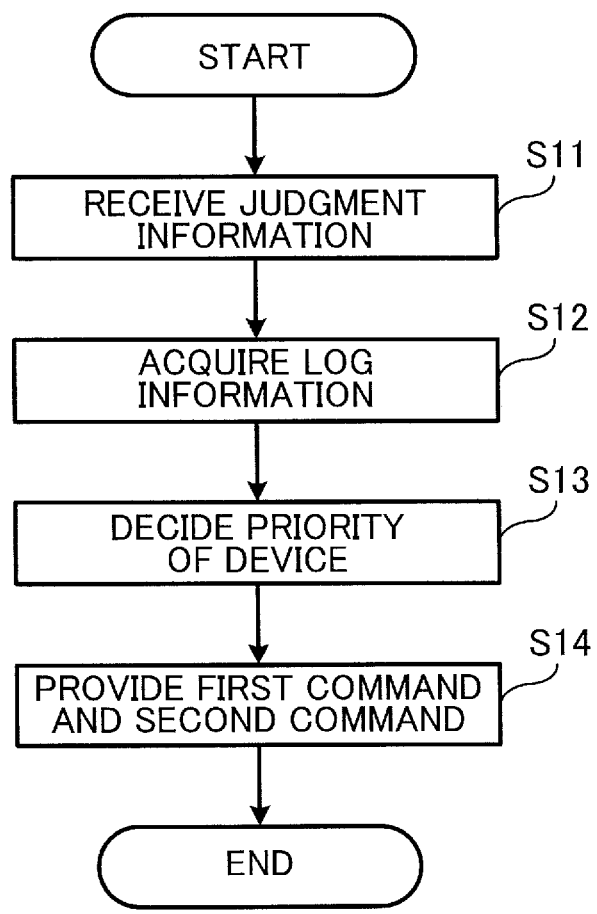
FIG. 21 is a flow chart showing a control method of the control system according to the present second embodiment.

FIG. 21 is a flow chart showing a control method of the control system 700 according to the present second embodiment.

First, the judgment information receiving unit 701 receives judgment information indicating whether or not log information is to be provided to a service operator from each of the plurality of devices 101 (step S11).

Next, the log information acquiring unit 704 acquires log information from devices set as devices that provide log information (step S12).

Subsequently, based on the acquired log information, the priority deciding unit 705 decides a priority of devices set as devices that do not provide log information (step S13).

Next, the command providing unit 702 provides the display device 103 with a first command for causing a first image, which represents a device indicated by judgment information that log information is to be provided, and a second image, which represents a device indicated by the judgment information as a device that does not provide the log information, to be displayed in display modes that differ from one another and a second command for causing the second image to be displayed based on the priority decided by the priority deciding unit 705 (step S14).

(Operation Example of the Control System)

Figure 22:
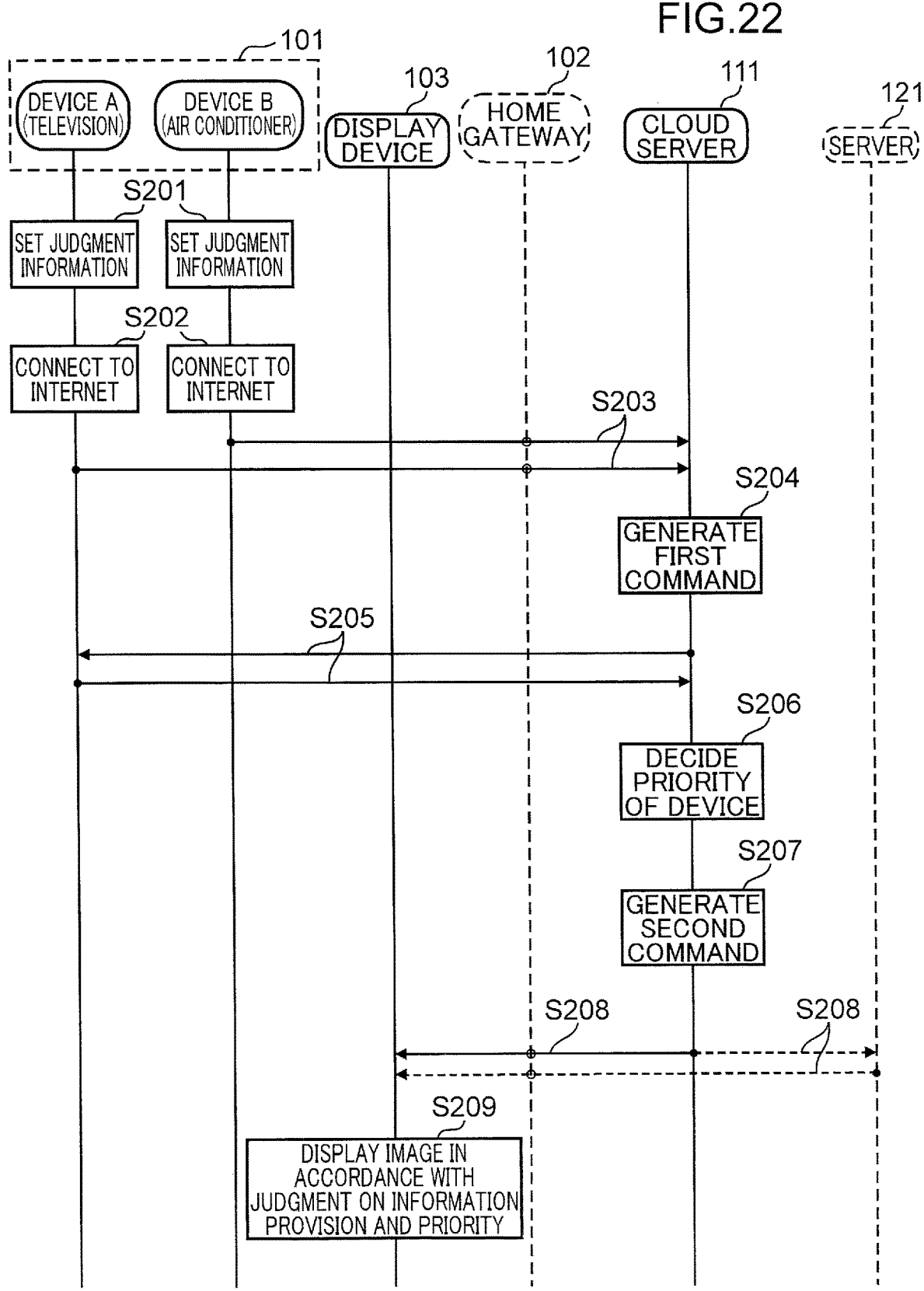
FIG. 22 is a sequence diagram for illustrating a specific operation example of the control system according to the present second embodiment.

Hereinafter, a more specific operation example of the control system according to the present second embodiment will be described with reference to FIG. 22. FIG. 22 is a sequence diagram for illustrating a specific operation example of the control system according to the present second embodiment. In this case, while a television is assumed as the device A and an air conditioner is assumed as the device B in a similar manner to the first embodiment, these devices simply represent an example and are not intended to limit the present embodiment.

Since operations in steps S201, S202, and S203 are similar to operations in steps S101, S102, and S103 in FIG. 5 according to the first embodiment, a description thereof will be omitted.

In step S204, the control unit 211 of the cloud server 111 generates a first command for displaying a first image representing a device indicated by the judgment information as a device that provides the log information to the service operator and a second image representing a device indicated by the judgment information as a device that does not provide the log information to the service operator in display modes that differ from each other. In other words, the control unit 211 of the cloud server 111 organizes devices (the device A) set as devices that provide log information and devices (the device B) set as devices that do not provide log information among the devices (the device A and the device B) connected to the Internet and generates the first command. Moreover, the process of generating the first command in step S204 is the same as the process of generating the command in step S104 shown in FIG. 5.

Next, in step S205, the communicating unit 212 of the cloud server 111 acquires log information from devices set as devices that provide log information. In this case, the operation in step S205 corresponds to the operation of the log information acquiring unit 704 in the control system 700 according to the present embodiment (the operation in step S12 in FIG. 21). In this example, judgment information "enable" is set for the device A (television) among the plurality of devices 101. Therefore, the control unit 201 of the device A has acquired log information regarding the device.

The control unit 211 of the cloud server 111 refers to judgment information acquired from each device and specifies devices set as devices that provide log information. In addition, the communicating unit 212 of the cloud server 111 transmits an acquisition request for acquiring log information to the specified devices. The communicating unit 202 of the device receives the acquisition request transmitted by the cloud server 111. The control unit 201 of the devices reads out log information stored in the memory 203. Subsequently, the communicating unit 202 transmits the read log information to the cloud server 111. The communicating unit 212 of the cloud server 111 receives the log information transmitted by the devices.

FIG. 23 is a diagram showing an example of log information acquired from the device A. Log information 1000 includes a date/time of operation, information regarding power on/off, name of a viewed program (for example, "AAAA"), and a category to which the viewed program belongs (for example, "news"). In the log information 1000, contents of operations of a device are organized according to date/time. Moreover, the control unit 201 of the device A among the plurality of devices 101 may organize log information as shown in FIG. 23 or the control unit 211 of the cloud server 111 may organize log information as shown in FIG. 23. In addition, log information acquired by the cloud server 111 is not limited to the above.

Next, in step S206, based on the acquired log information, the control unit 211 of the cloud server 111 decides a priority of devices set as devices that do not provide log information. In this case, the operation in step S206 corresponds to the operation of the priority deciding unit 705 in the control system 700 according to the present embodiment (the operation in step S13 in FIG. 21). Hereinafter, an example of a method of deciding priority will be described.

FIG. 24 is a diagram showing an example of information that is generated based on log information by a cloud server. Information 1001 shown in FIG. 24 is information indicating a viewing trend of the device A among the plurality of devices 101. First, the control unit 211 of the cloud server 111 generates the information 1001 from the log information 1000. In the information 1001, a ratio of categories of programs included in the log information 1000 is organized. In the example of the information 1001 shown in FIG. 24, a ratio of a category corresponding to "variety show" is 50%, a ratio of a category corresponding to "news" is 40%, a ratio of a category corresponding to "drama" is 5%, and a ratio of a category corresponding to "sports" is 5%.

In addition, the control unit 211 decides a viewing trend pattern 1011 representing a viewing trend of the device A (television) from the ratios of the categories. In this case, the viewing trend pattern 1011 representing a viewing trend is set by the data center operating company 110 or the service provider 120 based on a certain standard and any method of setting a viewing trend pattern may be used. As described above, the control unit 211 may decide a viewing trend pattern based on a category with a high viewing trend. For example, when the ratio of "news" is highest, a viewing trend pattern "A" is decided, when the ratio of "sports" is highest, a viewing trend pattern "B" is decided, when the ratio of "variety show" is highest, a viewing trend pattern "C" is decided, and when the ratio of "drama" is highest, a viewing trend pattern "D" is decided.

In addition, the control unit 211 may classify viewing trend patterns into a plurality of viewing trend patterns according to the age, the gender, or the place of residence of the user. Furthermore, the information 1001 may be any information as long as the information is classified or organized according to some kind of indicator from the log information 1000 and is not limited to the information shown in FIG. 24.

Figure 25:
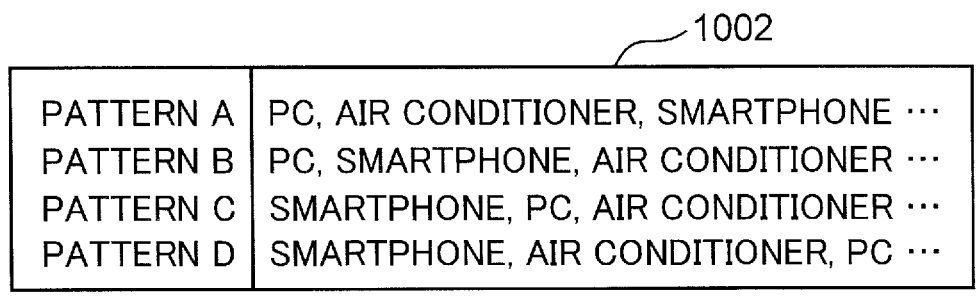
FIG. 25 is a diagram showing an example of a table that associates viewing trend patterns with priorities of devices.

FIG. 25 is a diagram showing an example of a table that associates viewing trend patterns with priorities of devices. A table 1002 shown in FIG. 25 is a table representing priorities of devices respectively corresponding to a viewing trend pattern representing a viewing trend. The table 1002 shows four viewing trend patterns from a pattern A to a pattern D. For example, the pattern C sets priorities in an order of a smartphone, a PC, and an air conditioner.

By referring to the table 1002, the control unit 211 of the cloud server 111 decides priorities of devices corresponding to the viewing trend pattern 1011 that has been decided based on log information. In this case, the viewing trend pattern C defined in advance is decided as the viewing trend pattern of the user and priorities are decided in an order of a smartphone, a PC, and an air conditioner.

Moreover, the table 1002 is set by the data center operating company 110 or the service provider 120 based on a certain standard and any method of setting the table 1002 may be used. For example, as in the example shown in FIG. 25, a table may be created by analyzing the preference and daily habits of the user according to a viewing pattern obtained from a television viewing history and considering which of the devices can provide log information that enables better service to be provided. The table 1002 is stored in a main memory 213 in the cloud server 111 or the server 121.

As a result, based on the log information, the cloud server 111 decides a priority of devices which provides log information to the service operator among the plurality of devices indicated that log information is not to be provided to the service operator. Accordingly, for which device among the devices set as devices that do not provide log information should the user of the plurality of devices 101 be prompted to provide log information can be decided by considering the preference of the user.

Figure 26:
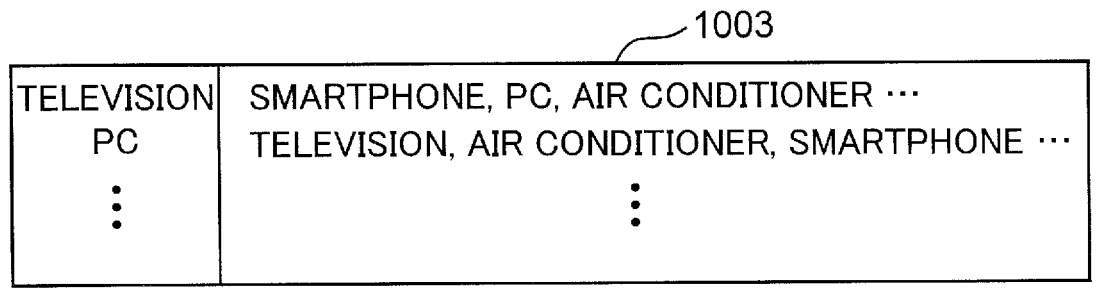
FIG. 26 is a diagram showing an example of a table associating devices that provide log information with priorities.

Moreover, a method of deciding priorities is not limited to the above. For example, the cloud server 111 may decide priorities without using log information acquired from the devices (without performing the process of step S205). FIG. 26 is a diagram showing an example of a table associating devices that provide log information with priorities. The control unit 211 of the cloud server 111 may refer to a table 1003 shown in FIG. 26 and decide for which device should the user be prompted to provide log information based on devices set as devices that provide log information. In the example shown in FIG. 26, when devices set as devices that provide log information include a television, priorities are decided in an order of a smartphone, a PC, and an air conditioner. The table 1003 is stored in a main memory 213 in the cloud server 111 or the server 121.

Next, in step S207, the control unit 211 of the cloud server 111 generates a second command for causing the second image representing a device indicated that log information is not to be provided to be displayed based on the priority decided in step S206. In other words, the control unit 211 of the cloud server 111 generates a second command representing an order in which devices indicated that log information is not to be provided are to be displayed.

Next, in step S208, the communicating unit 212 of the cloud server 111 provides the first command (the command 504 or the command 505) for causing a first image, which represents a device indicated by the judgment information as a device that provides the log information, and a second image, which represents a device indicated by the judgment information as a device that does not provide the log information, to be displayed by the display device 103 in display modes that differ from one another to the display device 103 that is associated with the identifier A. In addition, the communicating unit 212 of the cloud server 111 provides a second command for causing the second image, which represents a device indicated that log information is not to be provided, to be displayed based on the priority decided in step S206 to the display device 103. The display device 103 receives the first command and the second command transmitted by the cloud server 111.

In this case, the operation in step S208 corresponds to the operation of the command providing unit 702 in the control system 700 according to the present embodiment (the operation in step S14 in FIG. 21). Moreover, depending on a business type, the cloud server 111 may provide the first command and the second command to the server 121 of the service provider 120 and the server 121 may provide the first command and the second command to the display device 103. Types of business will be described later. In addition, when the home gateway 102 is present, the cloud server 111 or the server 121 may provide the first command and the second command via the home gateway 102.

Moreover, while the cloud server 111 acquires log information in step S205 after generating the first command in step S204 in the present embodiment, the present invention is not limited thereto. The cloud server 111 may acquire log information without generating the first command, and after deciding priorities of devices which provides log information to the service operator among the plurality of devices indicated that log information is not to be provided to the service operator in step S206, the cloud server 111 may generate the first command and the second command in step S207.

Next, in step S209, based on the first command (the command 504 or the command 505) provided by the cloud server 111, the display device 103 displays images representing the device A, the device B, and other devices among the plurality of devices 101 in modes corresponding to the judgment on information provision. In addition, the display device 103 displays a second image corresponding to devices which do not provide log information by reflecting priorities based on the second command which displays the second image based on the priorities provided by the cloud server 111.

Figure 27:
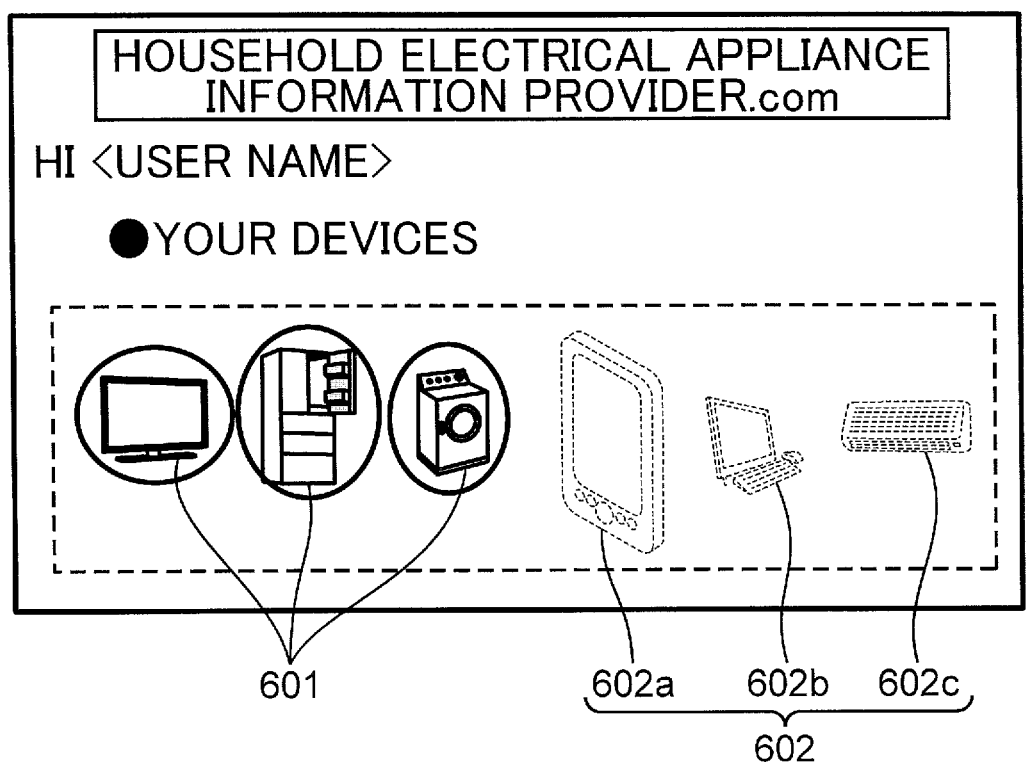
FIG. 27 is a diagram showing an example of a screen that is displayed on a display device according to the present second embodiment.

FIG. 27 is a diagram showing an example of a screen that is displayed on the display device 103 according to the present second embodiment. In the present second embodiment, in a similar manner to the first embodiment, a personal web page set up by the service provider 120 is used as a screen for displaying judgment information of each device. In a similar manner to the first embodiment, a screen for displaying judgment information of each device on the display device 103 is not limited to a web page such as that shown in FIG. 27.

In FIG. 27, images (icons) depicting all devices connected to the Internet in step S203 among the plurality of devices 101 in the group 100 are displayed. In addition, in a similar manner to the first embodiment, the display device 103 displays the first image 601 representing a device set by the judgment information as a device that provides the log information such as the device A (television), the refrigerator, and the washing machine among the plurality of devices 101 and the second image 602 representing a device set by the judgment information as a device that does not provide the log information such as the device B (air conditioner), the PC, and the smartphone among the plurality of devices 101 in display modes that differ from each other. In other words, the display device 103 sets a brightness value of the first image 601 to be higher than a brightness value of the second image 602. Moreover, in FIG. 27, images with high brightness are depicted by solid lines and images with low brightness are depicted by dashed lines.

In addition, the display device 103 displays the second image 602 representing a device set by judgment information as a device that does not provide log information in an order corresponding to priorities decided in step S206. The display device 103 displays the second image 602 from left to right on the display screen in a descending order of priority. For example, when a device with a highest priority is a smartphone, a device with a second highest priority is a PC, and a device with a third highest priority is an air conditioner among devices which do not provide log information, the display device 103 displays an image 602a showing a smartphone, an image 602b showing a PC, and an image 602c showing an air conditioner in this order from left to right on the display screen.

Moreover, as shown in FIG. 27, the display device 103 may display the second image 602 by varying a size thereof according to priority. In other words, the display device 103 may display a second image representing a device with the highest priority among the second images 602 to be largest and may display the second images in gradually smaller sizes as priorities become lower.

Moreover, a method of reflecting decided priorities to display is not limited to the example shown in FIG. 27. For example, the display device 103 may only display the second image 602 with the highest priority.

In addition, the display device 103 may display the second images from top to bottom of the display screen in a descending order of priority.

Furthermore, while the control unit 211 of the cloud server 111 generates the first command and the second command in the present second embodiment, the present invention is not particularly limited and a command that consolidates the first command and the second command may be generated instead. For example, in the command 504 shown in FIG. 9, a priority may be associated with each of the devices which do not provide log information (devices whose flags are "0"). When a device with a highest priority is a smartphone, a device with a second highest priority is a PC, and a device with a third highest priority is an air conditioner among devices which do not provide log information, a priority of "1" may be associated with the smartphone, a priority of "2" may be associated with the PC, and a priority of "3" may be associated with the air conditioner.

As described above, in the present second embodiment, log information is acquired from devices set as devices that provide log information among the plurality of devices 101, priorities at which provision of log information is to be prompted are decided with respect to a plurality of devices set as devices that do not provide log information, and the priorities are reflected on display. Accordingly, provision of log information of devices necessary to realize a service that is desirably provided by the service provider 120 can be preferentially prompted. Therefore, the service provider 120 can readily provide service that is optimized for each user.

Third Embodiment (Configuration of Respective Devices)

Since a configuration of the respective devices according to the present third embodiment is similar to that of the first embodiment, a description thereof will be omitted. Hereinafter, the same reference numerals as used in the first embodiment will be used.

(Configuration of the Control System)

Figure 28:
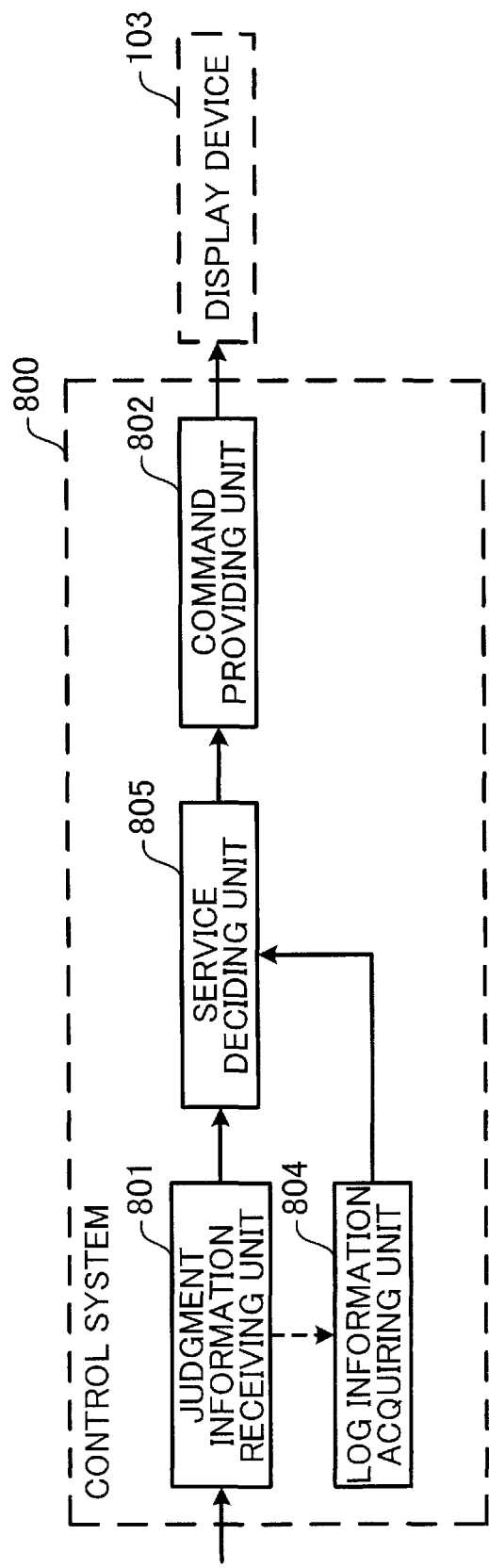
FIG. 28 is a diagram showing a configuration of a control system according to a present third embodiment.

FIG. 28 is a diagram showing a configuration of a control system 800 according to the present third embodiment.

The control system 800 includes a judgment information receiving unit 801, a command providing unit 802, a log information acquiring unit 804, and a service deciding unit 805.

Since processes performed by the judgment information receiving unit 801 and the command providing unit 802 are similar to processes performed by the judgment information receiving unit 301 and the command providing unit 302 according to the first embodiment, a description thereof will be omitted. In addition, since a process performed by the log information acquiring unit 804 is similar to the process performed by the log information acquiring unit 704 according to the second embodiment, a description thereof will be omitted.

Based on received log information, the service deciding unit 805 decides a service to be provided to the user when a device indicated that log information is not to be provided to a service operator is subsequently indicated that log information is to be provided to the service operator. The service deciding unit 805 decides a service to be provided to the user based on log information outputted by the log information acquiring unit 804 and judgment information outputted by the judgment information receiving unit 801. A service to be provided to the user involves, for example, awarding points that can be used to purchase products and a discount ticket that applies when purchasing products and a content thereof is not particularly limited.

In this case, the control unit 211 of the cloud server 111 owned by the data center operating company 110 may include the service deciding unit 805. In addition, the control unit 211 of the server 121 owned by the service provider 120 may include the service deciding unit 805. Furthermore, the control unit 211 of the home gateway 102 of the group 100 may include the service deciding unit 805.

The command providing unit 802 provides the display device 103 with a first command for causing a first image, which represents a device indicated by judgment information that log information is to be provided, and a second image, which represents a device indicated by the judgment information as a device that does not provide the log information, to be displayed in display modes that differ from one another and a third command for causing a service to be provided to the user when provision of information of a device set as a device that does not provide log information is allowed.

In this case, the control unit 211 of the cloud server 111 owned by the data center operating company 110 may include the command providing unit 802. In addition, the control unit 211 of the server 121 owned by the service provider 120 may include the command providing unit 802. Furthermore, the control unit 211 of the home gateway 102 of the group 100 may include the command providing unit 802.

Moreover, the control system 800 may further include a command generating unit. The command generating unit generates a first command for causing a first image, which represents a device indicated by judgment information that log information is to be provided, and a second image, which represents a device indicated by the judgment information as a device that does not provide the log information, to be displayed in display modes that differ from one another and a third command for causing a service to be provided to the user when provision of information of a device set as a device that does not provide log information is allowed.

(Description of Control Method of Control System)

Figure 29:
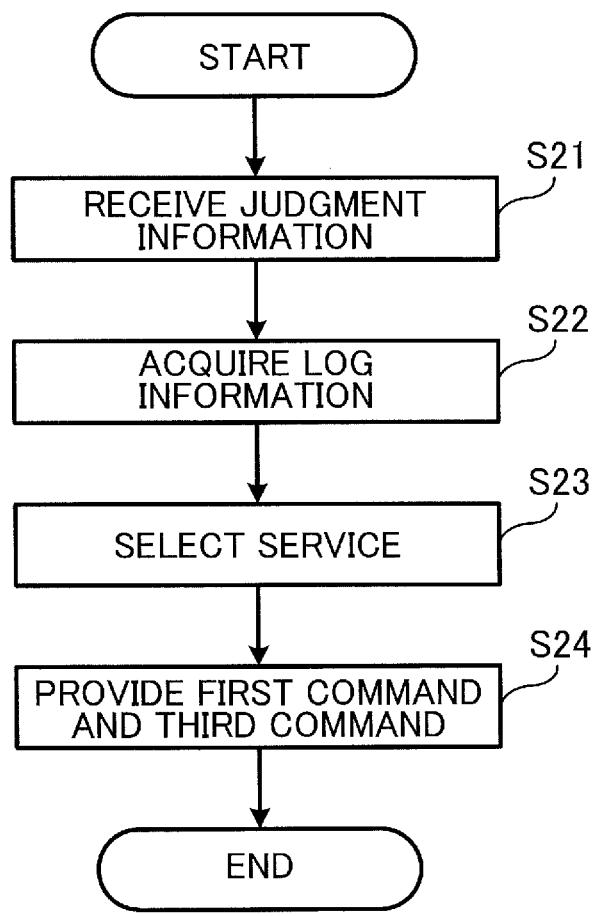
FIG. 29 is a flow chart showing a control method of the control system according to the present third embodiment.

FIG. 29 is a flow chart showing a control method of the control system 800 according to the present third embodiment.

First, the judgment information receiving unit 801 receives judgment information indicating whether or not log information is to be provided to a service operator from each of the plurality of devices 101 (step S21).

Next, the log information acquiring unit 804 acquires log information from devices set as devices that provide log information (step S22).

Subsequently, the service deciding unit 805 decides a service to be provided to the user based on the acquired log information (step S23).

Next, the command providing unit 802 provides the display device 103 with a first command for causing a first image, which represents a device indicated by judgment information that log information is to be provided, and a second image, which represents a device indicated by the judgment information as a device that does not provide the log information, to be displayed in display modes that differ from one another and a third command for causing a service to be provided to the user when provision of information of a device set as a device that does not provide log information is allowed (step S24).

(Operation Example of the Control System)

Hereinafter, a more specific operation example of the control system according to the present third embodiment will be described with reference to FIG. 30. FIG. 30 is a sequence diagram for illustrating a specific operation example of the control system according to the present third embodiment. In this case, while a television is assumed as the device A and an air conditioner is assumed as the device B in a similar manner to the first and second embodiments, these devices simply represent an example and are not intended to limit the present embodiment.

Since operations in steps S401, S402, and S403 are similar to operations in steps S101, S102, and S103 in FIG. 5 according to the first embodiment, a description thereof will be omitted. In addition, since operations in steps S404 and S405 are similar to operations in steps S204 and S205 in FIG. 22 according to the second embodiment, a description thereof will be omitted.

In step S406, based on log information acquired from the device A, the control unit 211 of the cloud server 111 decides a service to be provided to the user when a device set as a device that does not to provide log information is subsequently set as a device that provides log information. In this case, the operation in step S406 corresponds to the operation of the service deciding unit 805 in the control system 800 according to the present embodiment (the operation in step S23 in FIG. 29). Hereinafter, a method of deciding a service will be described.

FIG. 31 is a diagram showing an example of a table 1500 for deciding a service. Table 1500 represents an example where devices that are objects to be prompted to provide log information are a smartphone and an air conditioner and devices that already provide the information are a television and a refrigerator. Moreover, the table 1500 for deciding a service is not limited to this example.

When an object device for prompting log information to be provided is a smartphone and a television is present as a device already providing log information, a service is decided based on a viewing trend pattern representing a viewing trend of the user which is obtained from the television as shown in table 1500. A viewing trend pattern is similar to the viewing trend pattern 1011 shown in FIG. 24 and described earlier in the second embodiment and indicates, for example, a category of programs which are frequently viewed by the user. In the example represented by the table 1500 shown in FIG. 31, a viewing trend pattern A indicates that a "sports" category has been frequently viewed, a viewing trend pattern B indicates that a "drama" category has been frequently viewed, and a viewing trend pattern C indicates that a "variety show" category has been frequently viewed. The table 1500 also shows that, for example, information regarding tickets for a sporting event is to be distributed to the smartphone of the user of the television that has been determined as the viewing trend pattern A.

In other words, when a viewing trend pattern of the user is acquired as log information of the television and a smartphone set so as devices that provide log information is subsequently set as devices that provide log information, a service is provided for distributing information regarding tickets in accordance with the viewing trend pattern to the smartphone. When the device indicated that log information is to be provided to a service operator is a television, the log information includes a viewing history of the television and the service is decided based on a viewing trend obtained from the viewing history.

In addition, when an object device for prompting log information to be provided is a smartphone and a refrigerator is present as a device already providing log information, a service is decided based on a stock status of food in the refrigerator as shown in table 1500. The example of table 1500 in FIG. 31 shows how a store from which a coupon is to be distributed to the smartphone is decided based on information regarding food that is likely to run out among the food in the refrigerator. In other words, when stock status of food in the refrigerator is acquired as log information of the refrigerator and a smartphone set so as devices that provide log information is subsequently set as devices that provide log information, a service is provided for distributing information regarding a coupon of a retail outlet in accordance with the food that is likely to run out.

In addition, when an object device for prompting log information to be provided is an air conditioner and a television is present as a device already providing log information, an air conditioner operating service that conforms to a lifestyle of the user is decided as shown in table 1500. An air conditioner operating service that conforms to a lifestyle of the user is a service involving, for example, when times where the television is turned on/off in the course of a single day are acquired as represented by log information 1000 shown in FIG. 23 according to the second embodiment, by learning a life style of a week from the acquired on/off times, the air conditioner is automatically turned on or off at an optimal time (a time where the user views television).

In other words, when the times where the television is turned on/off are acquired as log information of the television and an air conditioner set as devices that provide log information is subsequently set as devices that provide log information, an operating service in accordance with the viewing times of the user is provided to the air conditioner.

By referring to the table 1500, the control unit 211 of the cloud server 111 decides a service to be provided to the user when provision of information of a device set as a device that does not provide log information is allowed. Moreover, the table 1500 is set by the data center operating company 110 or the service provider 120 based on a certain standard and any method of setting the table 1500 may be used. The table 1500 is stored in a main memory 213 in the cloud server 111 or the server 121.

According to the method described above, a service to be provided to the user based on log information is decided. As a result, an optimal service conforming to the preference of the user can be provided. Moreover, a method of deciding a service is not limited to the above as long as the service is decided based on log information.

Next, in step S407, the control unit 211 of the cloud server 111 generates a third command for causing the service decided in step S406 to be displayed. In other words, the control unit 211 of the cloud server 111 generates a third command for causing a service that is provided to the user when provision of information of a device set as a device that does not provide log information is allowed to be displayed.

Next, in step S208, the communicating unit 212 of the cloud server 111 provides the first command (the command 504 or the command 505) for causing a first image, which represents a device indicated by the judgment information as a device that provides the log information, and a second image, which represents a device indicated by the judgment information as a device that does not provide the log information, to be displayed by the display device 103 in display modes that differ from one another to the display device 103 that is associated with the identifier A. In addition, the communicating unit 212 of the cloud server 111 provides the display device 103 that is associated with the identifier A with a third command for causing a service that is provided to the user when provision of information of a device set as a device that does not provide log information is allowed to be displayed on the display device 103. The display device 103 receives the first command and the third command transmitted by the cloud server 111.

In this case, the operation in step S208 corresponds to the operation of the command providing unit 802 in the control system 800 according to the present embodiment (the operation in step S24 in FIG. 29). Moreover, depending on a business type, the cloud server 111 may send the first command and the third command to the server 121 of the service provider 120 and the server 121 may provide the first command and the third command to the display device 103. Types of business will be described later. In addition, when the home gateway 102 is present, the cloud server 111 or the server 121 may provide the first command and the third command via the home gateway 102.

Moreover, while the cloud server 111 acquires log information in step S405 after generating the first command in step S404 in the present embodiment, the present invention is not limited thereto. The cloud server 111 may acquire log information without generating the first command, and after deciding a service to be provided to the user when provision of information of a device set as a device that does not provide log information is allowed in step S406, the cloud server 111 may generate the first command and the third command in step S407.

Next, in step S409, based on the first command (the command 504 or the command 505) provided by the cloud server 111, the display device 103 displays images representing the device A, the device B, and other devices among the plurality of devices 101 in modes corresponding to the judgment on information provision. In addition, based on the third command provided by the cloud server 111 for causing a service to be displayed, the display device 103 displays a service to be provided to the user when provision of information of a device set as a device that does not provide log information is allowed.

Figure 32:
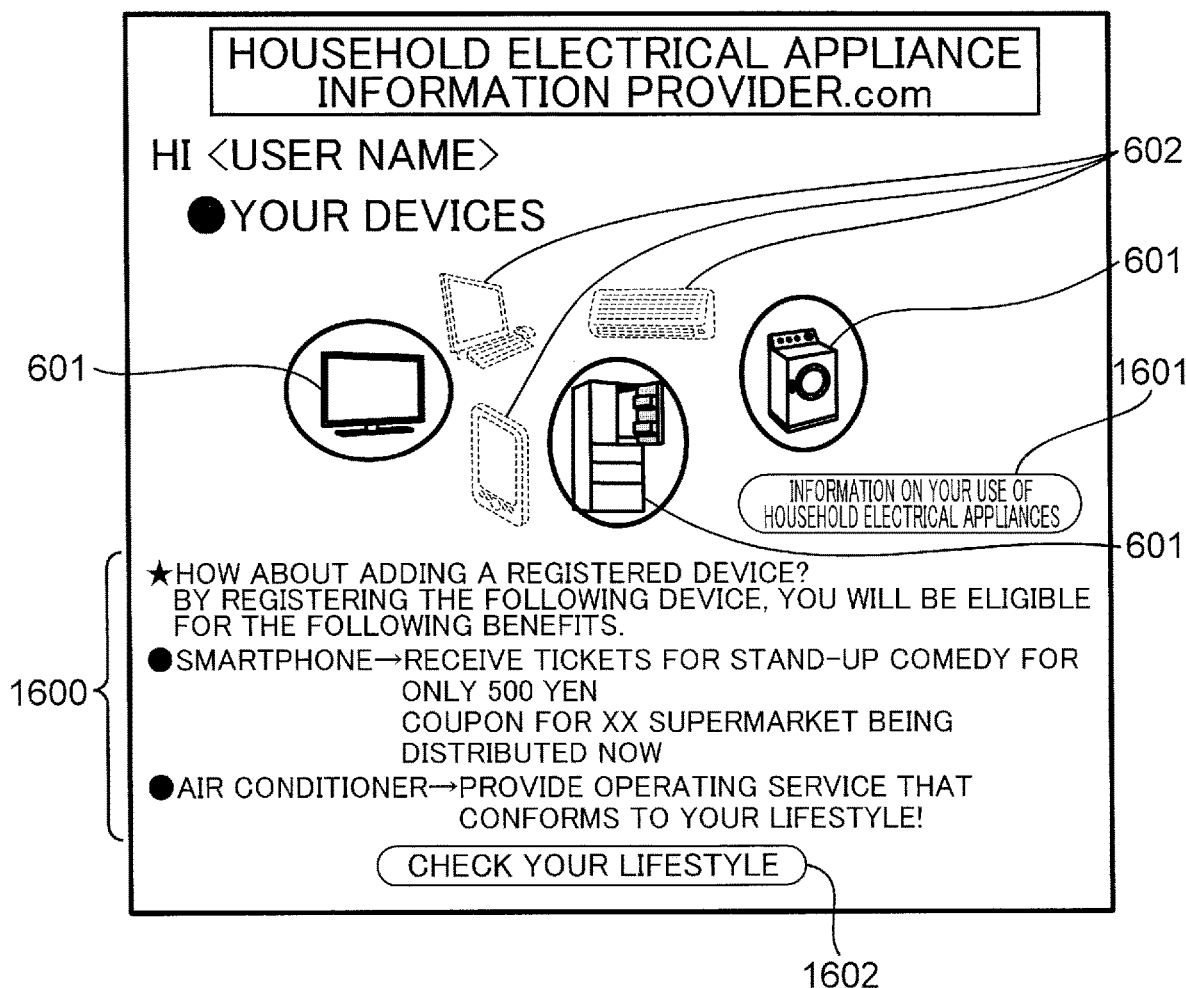
FIG. 32 is a diagram showing an example of a screen that is displayed on a display device according to the present third embodiment.

FIG. 32 is a diagram showing an example of a screen that is displayed on the display device 103 according to the present third embodiment. In the present third embodiment, in a similar manner to the first embodiment, a personal web page set up by the service provider 120 is used as a screen for displaying judgment information of each device. In a similar manner to the first embodiment, a screen for displaying judgment information of each device on the display device 103 is not limited to a web page such as that shown in FIG. 32.

In FIG. 32, images (icons) depicting all devices connected to the Internet in step S403 among the plurality of devices 101 in the group 100 are displayed. In addition, in a similar manner to the first embodiment, the display device 103 displays the first image 601 representing a device set by the judgment information as a device that provides the log information such as the device A (television), the refrigerator, and the washing machine among the plurality of devices 101 and the second image 602 representing a device set by the judgment information as a device that does not provide the log information such as the device B (air conditioner), the PC, and the smartphone among the plurality of devices 101 in display modes that differ from each other. In other words, the display device 103 sets a brightness value of the first image 601 to be higher than a brightness value of the second image 602. Moreover, in FIG. 32, images with high brightness are depicted by solid lines and images with low brightness are depicted by dashed lines.

Moreover, the display device 103 displays information 1600 for prompting provision of information to a device indicated by judgment information that log information is not to be provided. In this case, the display device 103 guides the user by displaying a text reading "How about adding a registered device?" In addition, after a text reading "By registering the following device, you will be eligible for the following benefits", the display device 103 displays the service decided by the process of step S406 in FIG. 30.

At this point, the cloud server 111 may control the display device 103 so as to present to the user log information on which the decision of the server had been based on in the process of step S406 in FIG. 30.

FIG. 33 is a diagram showing an example of a screen for displaying log information acquired from a television and a refrigerator when deciding a service to be provided when provision of log information of a smartphone is allowed, and FIG. 34 is a diagram showing an example of a screen for displaying log information acquired from a television when deciding a service to be provided when provision of log information of an air conditioner is allowed.

For example, FIG. 33 shows log information obtained from the television and the refrigerator on which a decision to provide a service had been based when a smartphone is set as a device that provides log information. By clicking a button 1601 displayed on a web screen (FIG. 32), the user can confirm a web screen shown in FIG. 33. The display device 103 accepts selection of the first button 1601 displayed on the web screen (FIG. 32), and when the first button 1601 is clicked by the user, the display device 103 acquires the web screen shown in FIG. 33 from the cloud server 111 and displays the web screen.

A viewing trend pattern of a television and an image that is a graph representation of a viewing ratio of each category are shown on the screen in FIG. 33. In addition, stock information in the refrigerator is also shown on the screen in FIG. 33.

In a similar manner, FIG. 34 shows log information obtained from the television on which a decision to provide a service had been based when an air conditioner is set as a device that provides log information. By clicking a second button 1602 displayed on the web screen (FIG. 32), the user can confirm a web screen shown in FIG. 34. The display device 103 accepts selection of the second button 1602 displayed on the web screen (FIG. 32), and when the second button 1602 is clicked by the user, the display device 103 acquires the web screen shown in FIG. 34 from the cloud server 111 and displays the web screen.

For example on the screen shown in FIG. 34, an average time of day at which the television is initially turned on in that day and an average time of day at which the television is finally turned off in that day are displayed for each day of the week. Accordingly, the user becomes aware of a use history of household electrical appliances owned by the user. In addition, the user can confirm the reason that the service represented by information 1600 is to be provided. Therefore, the user can gain a sense of satisfaction.

As described above, according to the present third embodiment, log information is acquired from a device set as a device that provides log information among a plurality of devices 101. Based on the acquired log information, a service to be provided to the user when provision of information of a device set as a device that does not provide log information is allowed is displayed. Therefore, a service that is optimized for the user can be provided. In addition, from the perspective of a service provider, by presenting a service suiting the preference of the user, the user can be guided to the service in an efficient manner.

Fourth Embodiment (Configuration of respective devices) Since a configuration of the respective devices according to the present fourth embodiment is similar to that of the first embodiment, a description thereof will be omitted. Hereinafter, the same reference numerals as used in the first embodiment will be used.

Figure 35:
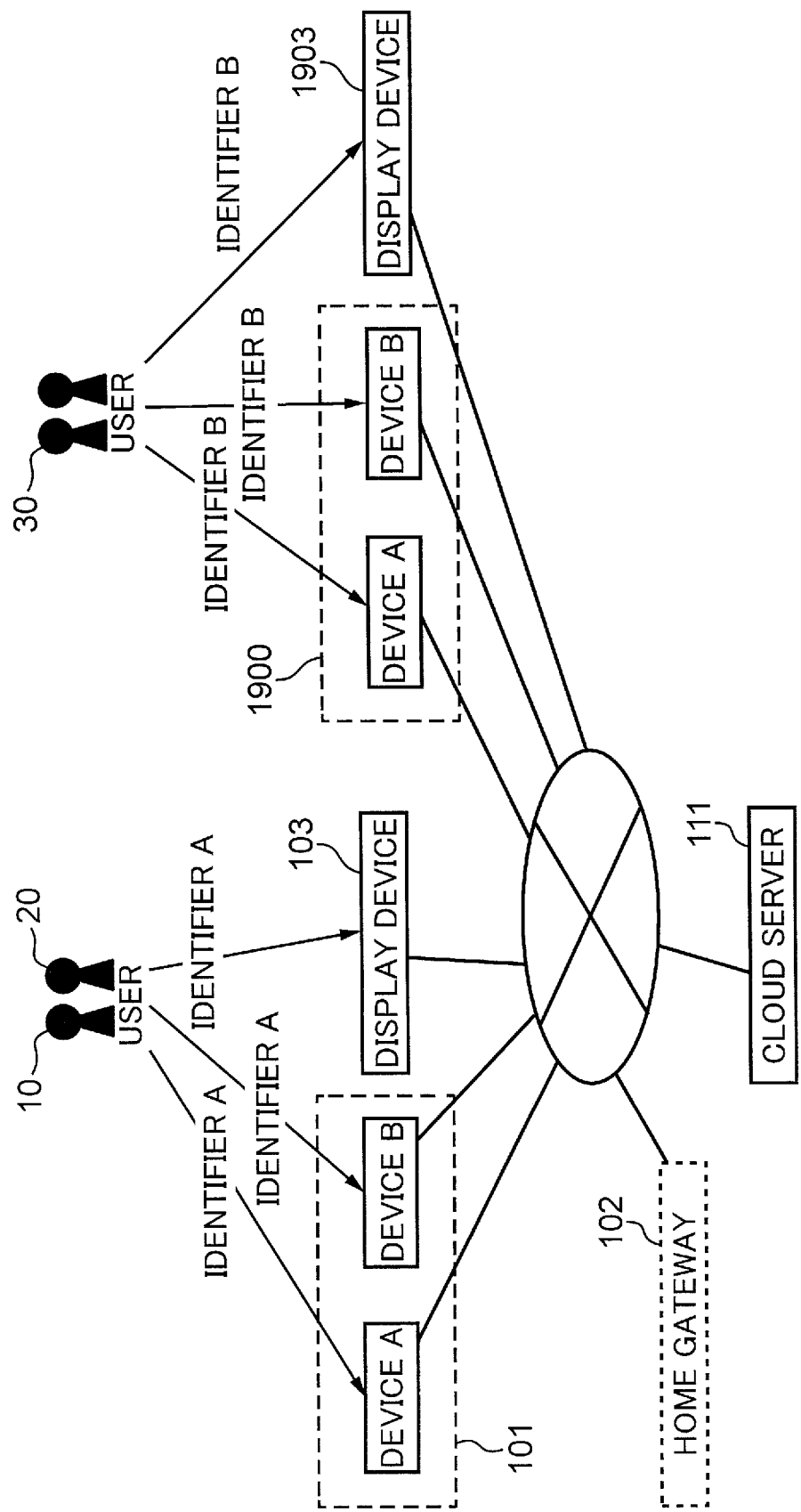
FIG. 35 is a diagram showing an overall configuration of a control system according to a present fourth embodiment.

FIG. 35 is a diagram showing an overall configuration of a control system according to the present fourth embodiment.

In the present fourth embodiment, as shown in FIG. 35, an information management system includes a plurality of devices 101 and a display device 103 associated with a first identifier A used by users 10 and 20, and a plurality of devices 1900 and a display device 1903 associated with an identifier B used by a user 30. The second identifier B is an identifier that differs from the first identifier A. Since configurations of the plurality of devices 1900 and the display device 1903 are similar to the configurations of the plurality of devices 101 and the display device 103 according to the first embodiment, a description thereof will be omitted. A method of associating an identifier with a device is similar to the method described in the first embodiment. The plurality of devices 1900 associated with the second identifier B may be devices included in the group 100 or devices included in another group.

(Configuration of the Control System)

Figure 36:
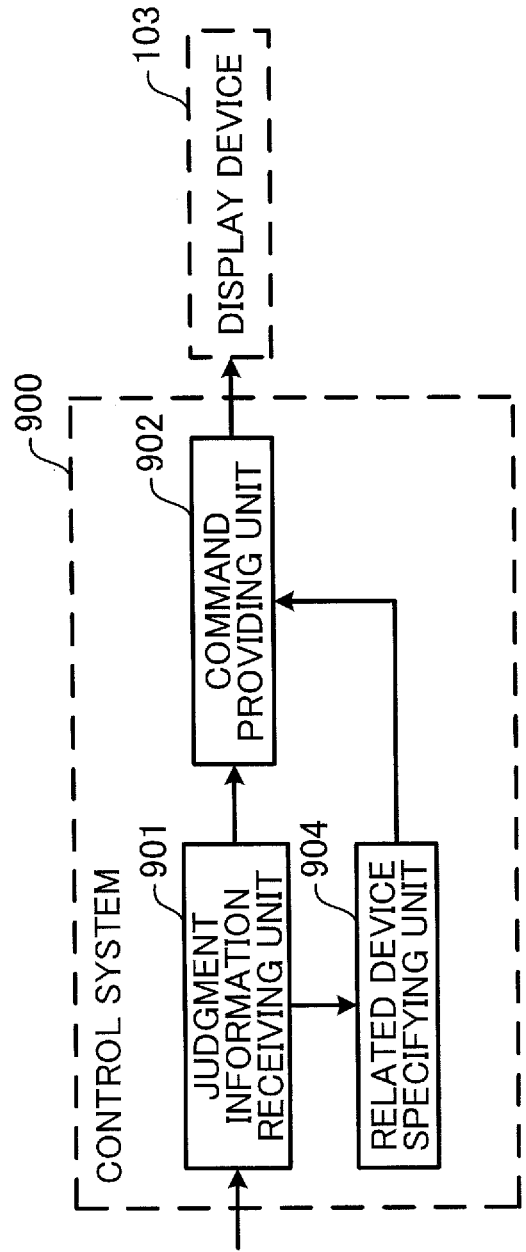
FIG. 36 is a diagram showing a configuration of the control system according to the present fourth embodiment.

FIG. 36 is a diagram showing a configuration of a control system 900 according to the present fourth embodiment.

The control system 900 includes a judgment information receiving unit 901, a command providing unit 902, and a related device specifying unit 904.

Since processes performed by the judgment information receiving unit 901 and the command providing unit 902 are similar to processes performed by the judgment information receiving unit 301 and the command providing unit 302 according to the first embodiment, a description thereof will be omitted.

The related device specifying unit 904 specifies a second device (a related device) associated with the second identifier B related to a first device which is associated with the first identifier A and which is indicated that log information is to be provided to a service operator. Based on judgment information outputted by the judgment information receiving unit 901, the related device specifying unit 904 specifies a related device associated with the second identifier B that differs from the first identifier A regarding a device set as a device that provides log information.

A related device refers to, for example, a device sharing a same model number. A model number is a number for distinguishing types of devices. In addition, a related device may be a device of a same manufacturer and a same type. In other words, devices belonging to a "television" category of "manufacturer A" may all be assumed to be related devices. Moreover, the related device specifying unit 904 may specify a related device associated with the second identifier B related to a device which is associated with the first identifier A and which is indicated that log information is not to be provided to a service operator.

In this case, the control unit 211 of the cloud server 111 owned by the data center operating company 110 may include the related device specifying unit 904. In addition, the control unit 211 of the server 121 owned by the service provider 120 may include the related device specifying unit 904. Furthermore, the control unit 211 of the home gateway 102 of the group 100 may include the related device specifying unit 904.

The command providing unit 902 provides the display device 103 with a first command for causing a first image, which represents a device indicated by judgment information that log information is to be provided, and a second image, which represents a device indicated by the judgment information as a device that does not provide the log information, to be displayed in display modes that differ from each other and a fourth command for causing information regarding a related device associated with the second identifier B to be displayed. Information regarding a related device is, for example, the number of related devices associated with the second identifier B.

In this case, the control unit 211 of the cloud server 111 owned by the data center operating company 110 may include the command providing unit 902. In addition, the control unit 211 of the server 121 owned by the service provider 120 may include the command providing unit 902. Furthermore, the control unit 211 of the home gateway 102 of the group 100 may include the command providing unit 902.

Moreover, the control system 900 may further include a command generating unit. The command generating unit generates a first command for causing a first image, which represents a device indicated by judgment information that log information is to be provided, and a second image, which represents a device indicated by the judgment information as a device that does not provide the log information, to be displayed in display modes that differ from one another and a fourth command for causing information regarding a related device associated with the second identifier B to be displayed.

(Description of Control Method of Control System)

Figure 37:
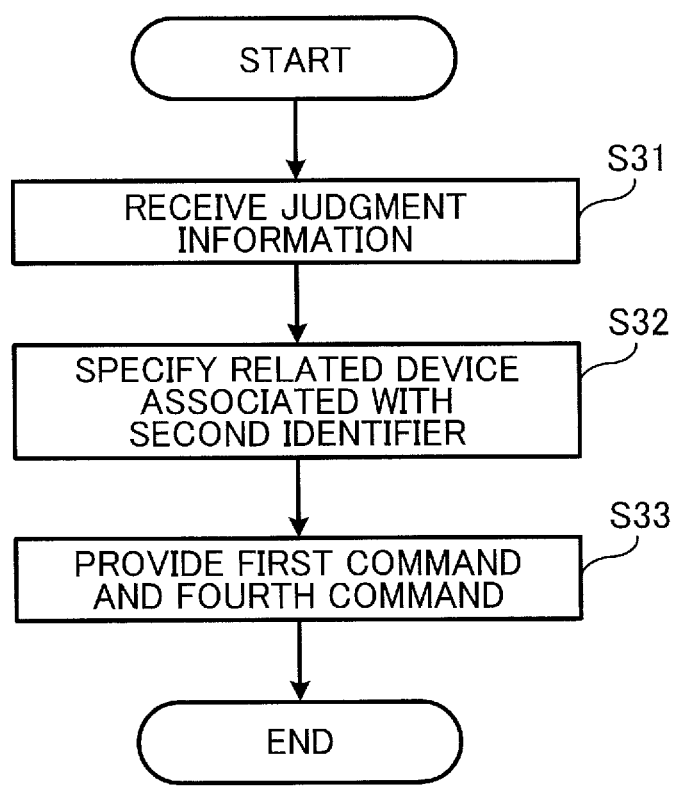
FIG. 37 is a flow chart showing a control method of the control system according to the present fourth embodiment.

FIG. 37 is a flow chart showing a control method of the control system 900 according to the present fourth embodiment.

First, the judgment information receiving unit 901 receives judgment information indicating whether or not log information is to be provided to a service operator from each of the plurality of devices 101 (step S31).

Subsequently, the related device specifying unit 904 specifies a related device associated with another identifier (the second identifier B) regarding a device set as a device that provides log information (step S32). The related device specifying unit 904 specifies a second device (a related device) associated with the second identifier B related to a first device which is associated with the first identifier A and which is indicated that log information is to be provided to a service operator.

Next, the command providing unit 902 provides the display device 103 with a first command for causing a first image, which represents a device indicated by judgment information that log information is to be provided, and a second image, which represents a device indicated by the judgment information as a device that does not provide the log information, to be displayed in display modes that differ from each other and a fourth command for causing information regarding a related device associated with another identifier (the second identifier B) to be displayed (step S33).

(Operation Example of the Control System)

Figure 38:
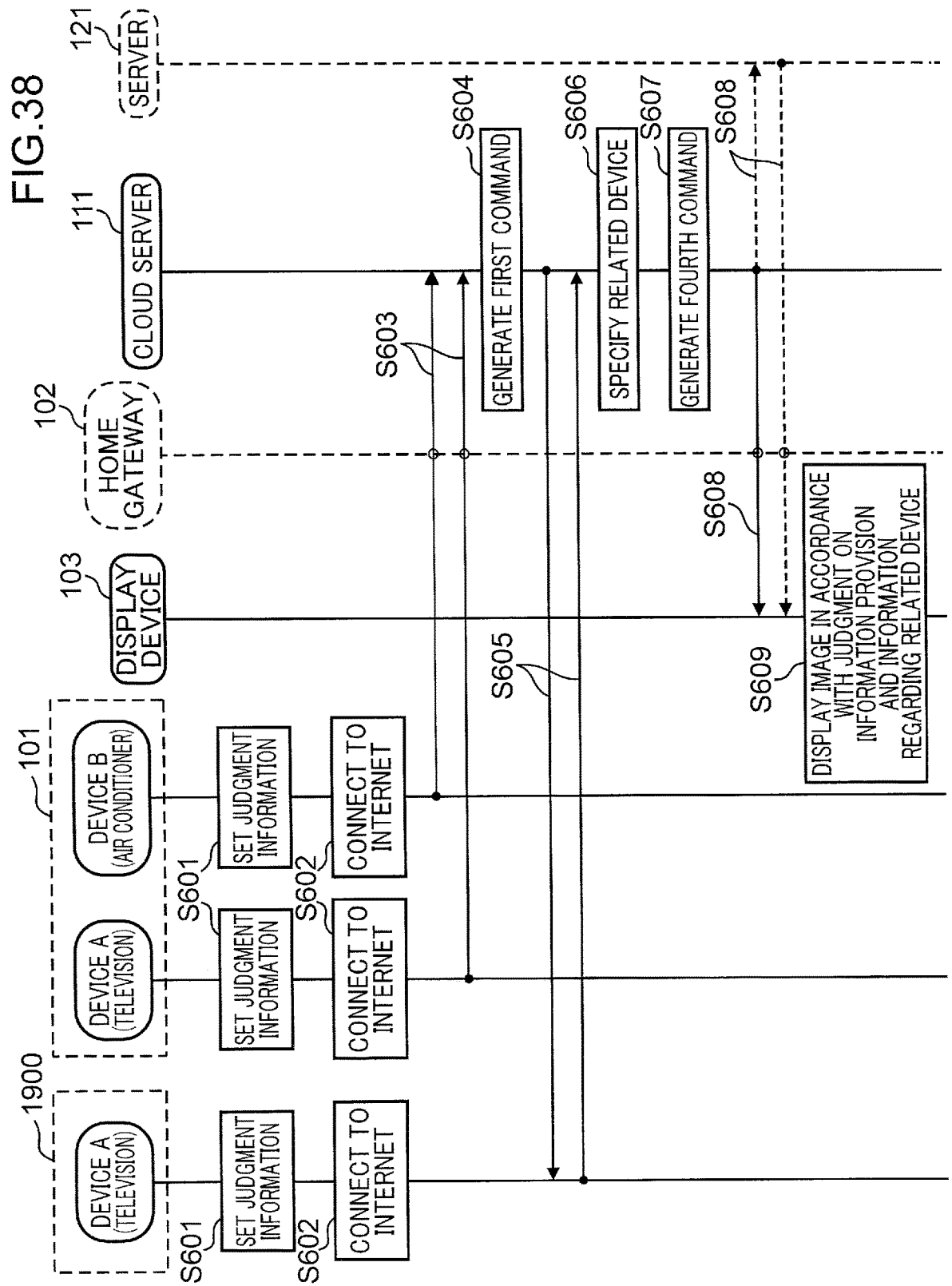
FIG. 38 is a sequence diagram for illustrating a specific operation example of the control system according to the present fourth embodiment.

Hereinafter, a more specific operation example of the control system according to the present fourth embodiment will be described with reference to FIG. 38. FIG. 38 is a sequence diagram for illustrating a specific operation example of the control system according to the present fourth embodiment. In this case, while a television is assumed as the device A and an air conditioner is assumed as the device B in a similar manner to the first, second, and third embodiments, these devices simply represent an example and are not intended to limit the present embodiment. In addition, the plurality of devices 1900 refer to devices associated with the second identifier B that differs from the first identifier A.

Since operations in steps S601, S602, and S603 are similar to operations in steps S101, S102, and S103 in FIG. 5 according to the first embodiment, a description thereof will be omitted. In addition, since the operation in step S604 is similar to the operation in step S204 in FIG. 22 according to the second embodiment, a description thereof will be omitted.

In this case, in step S605, the communicating unit 212 of the cloud server 111 acquires model number information regarding the device A set as a device that provides log information among the plurality of devices 1900 in another group. Moreover, the operation in step S605 need not necessary follow the operation in step S604 and the communicating unit 212 of the cloud server 111 may acquire, in advance, model number information from the plurality of devices 1900 associated with the identifier B. The information acquired from the plurality of devices 1900 need not necessarily be model number information of a device and may be information regarding a device type or information regarding a manufacturer.

In addition, the device A among the plurality of devices 1900 may notify judgment information to the cloud server 111 upon being connected to the Internet. Furthermore, the cloud server 111 may receive judgment information by requesting a notification indicating whether or not the device A among the plurality of devices 1900 has been connected to the Internet at fixed intervals. In this case, the device A among the plurality of devices 1900 may transmit information including an identifier, a device type, a manufacturer name, and a model number of the device (the information 501 in FIG. 6) to the cloud server 111. Accordingly, the operation in step S605 for requesting model number information regarding a device set as a device that provides log information becomes unnecessary.

Next, in step S606, the control unit 211 of the cloud server 111 specifies a related device associated with another identifier regarding a device set as a device that provides log information. As this point, when the plurality of devices 101 are associated with the first identifier A, for example, the other identifier refers to the second identifier B or all identifiers other than the first identifier A. In this case, the operation in step S606 corresponds to the operation of the related device specifying unit 904 in the control system 900 according to the present embodiment (the operation in step S32 in FIG. 37).

Figure 39:
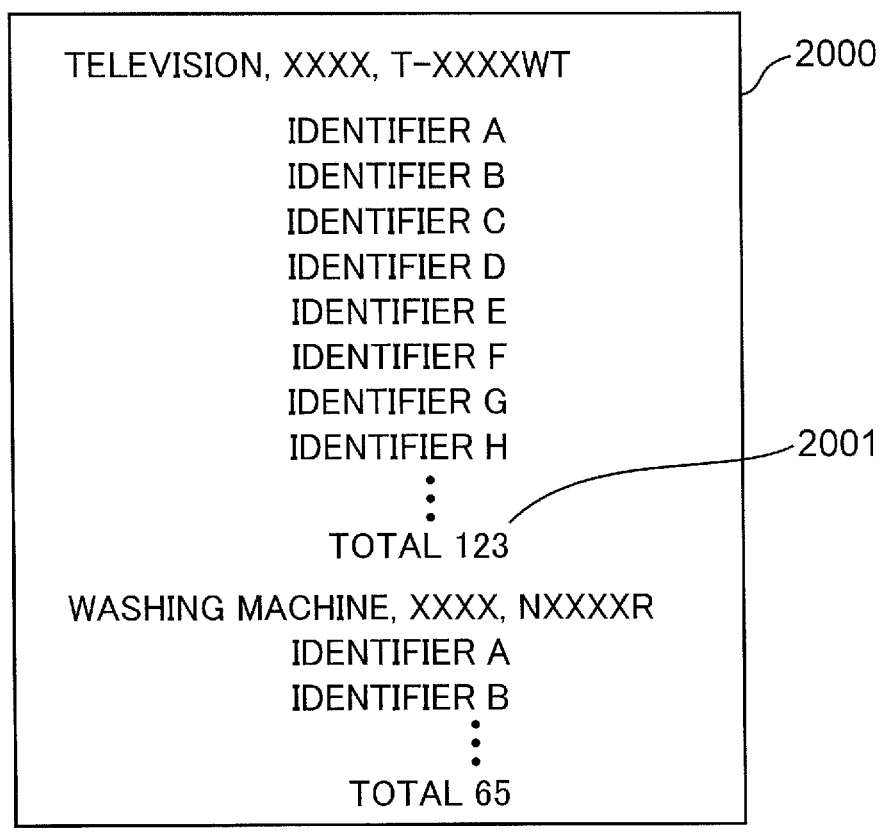
FIG. 39 is a diagram showing information regarding a related device that is specified by a cloud server.

FIG. 39 is a diagram showing information 2000 regarding a related device that is specified by the cloud server 111. In the example shown in FIG. 39, a television manufactured by "XXXX" and whose model number is "T-XXXXWT" is associated with an identifier A, an identifier B, an identifier C, . . . . In addition, devices corresponding to the respective identifiers are set as devices that provide log information. Furthermore, a total number 2001 of the identifiers is calculated as "123". Moreover, other identifiers are specified and the total number of identifiers is calculated in a similar manner with respect to a washing machine manufactured by "XXXX" and whose model number is "NXXXXR".

Next, in step S607, the control unit 211 of the cloud server 111 generates a fourth command for causing information regarding a second device (a related device) associated with the second identifier B related to a first device which is associated with the first identifier A and which is indicated that log information is to be provided to the service operator. In other words, the control unit 211 of the cloud server 111 generates the fourth command for causing information regarding a related device associated with another identifier based on the information 2000. Moreover, information regarding the related device is the number of devices sharing the same model number as the device which is associated with the first identifier A and which provides log information and being associated with another identifier. The control unit 211 of the cloud server 111 generates information regarding a related device by adding up the number of identifiers of each device in the information 2000 shown in FIG. 39.

Next, in step S608, the communicating unit 212 of the cloud server 111 provides the first command (the command 504 or the command 505) for causing a first image, which represents a device indicated by the judgment information as a device that provides the log information, and a second image, which represents a device indicated by the judgment information as a device that does not provide the log information, to be displayed by the display device 103 in display modes that differ from each other to the display device 103 that is associated with the first identifier A. In addition, the communicating unit 212 of the cloud server 111 provides the display device 103 associated with the first identifier A with the fourth command for causing information regarding a related device associated with another identifier and generated based on the information 2000 to be displayed on the display device 103. Moreover, for example, the fourth command is a command for displaying the total number 2001 of identifiers near a first image representing a television.

In this case, the operation in step S608 corresponds to the operation of the command providing unit 902 in the control system 900 according to the present embodiment (the operation in step S33 in FIG. 37). Moreover, depending on a business type, the cloud server 111 may provide the first command and the fourth command to the server 121 of the service provider 120 and the server 121 may provide the first command and the fourth command to the display device 103. Types of business will be described later. In addition, when the home gateway 102 is present, the cloud server 111 or the server 121 may provide the first command and the fourth command via the home gateway 102.

Moreover, while the cloud server 111 acquires model number information in step S605 after generating the first command in step S604 in the present embodiment, the present invention is not limited thereto. The cloud server 111 may acquire model number information without generating the first command, and after specifying the related device in step S606, the cloud server 111 may generate the first command and the fourth command in step S607.

Next, in step S609, based on the first command received from the cloud server 111, the display device 103 displays images representing the device A, the device B, and other devices among the plurality of devices 101 in modes corresponding to the judgment on information provision. In addition, the display device 103 displays information regarding a related device associated with another identifier based on the fourth command received from the cloud server 111.

Figure 40:
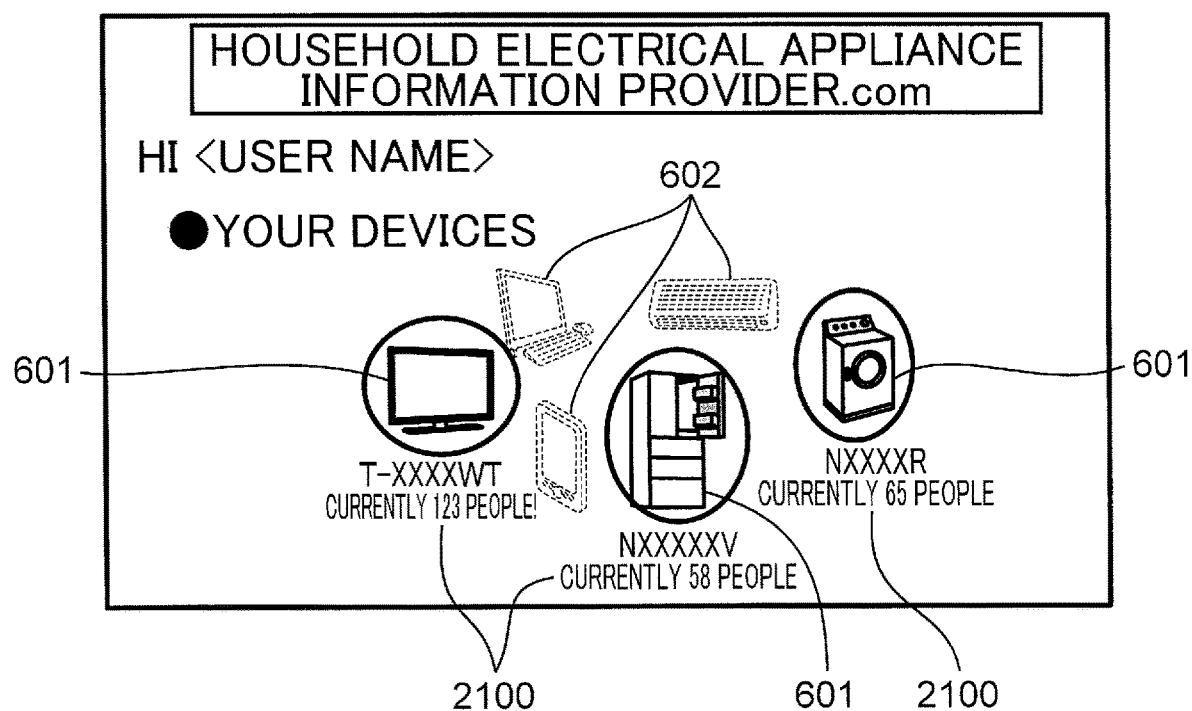
FIG. 40 is a diagram showing an example of a screen that is displayed on a display device according to the present fourth embodiment.

FIG. 40 is a diagram showing an example of a screen that is displayed on the display device 103 according to the present fourth embodiment. In the present fourth embodiment, in a similar manner to the first embodiment, a personal web page set up by the service provider 120 is used as a screen for displaying judgment information of each device. In a similar manner to the first embodiment, a screen for displaying judgment information of each device on the display device 103 is not limited to a web page such as that shown in FIG. 40.

In FIG. 40, images (icons) depicting all devices connected to the Internet in step S603 among the plurality of devices 101 in the group 100 are displayed. In addition, in a similar manner to the first embodiment, the display device 103 displays the first image 601 representing a device set by the judgment information as a device that provides the log information such as the device A (television), the refrigerator, and the washing machine among the plurality of devices 101 and the second image 602 representing a device set by the judgment information as a device that does not provide the log information such as the device B (air conditioner), the PC, and the smartphone among the plurality of devices 101 in display modes that differ from each other. In other words, the display device 103 sets a brightness value of the first image 601 to be higher than a brightness value of the second image 602. Moreover, in FIG. 40, images with high brightness are depicted by solid lines and images with low brightness are depicted by dashed lines.

At this point, the display device 103 displays information 2100 indicating a model number of a device which provides log information and the total number of devices which provides log information among the devices associated with the identifier specified in step S606. For example, the model number of a television is displayed as "T-XXXXWT" and the total number of televisions associated with other identifiers are displayed near the model number as "Currently 123 people!". Due to the display, the user can gain a sense of security that a large number of people have allowed log information to be provided and the provision of log information can be prompted with respect to devices set as devices that do not provide log information.

Moreover, the cloud server 111 may also control a device set by judgment information as a device that does not provide log information so as to display information indicating a model number of the device and the total number of devices which provides log information among the devices associated with other identifiers. Accordingly, the user can gain a sense of security that a large number of people have allowed log information to be provided even with respect to a device set by judgment information as a device that does not provide log information and an effect of prompting the provision of log information to a device set as a device that does not provide log information can be enhanced.

Figure 41:
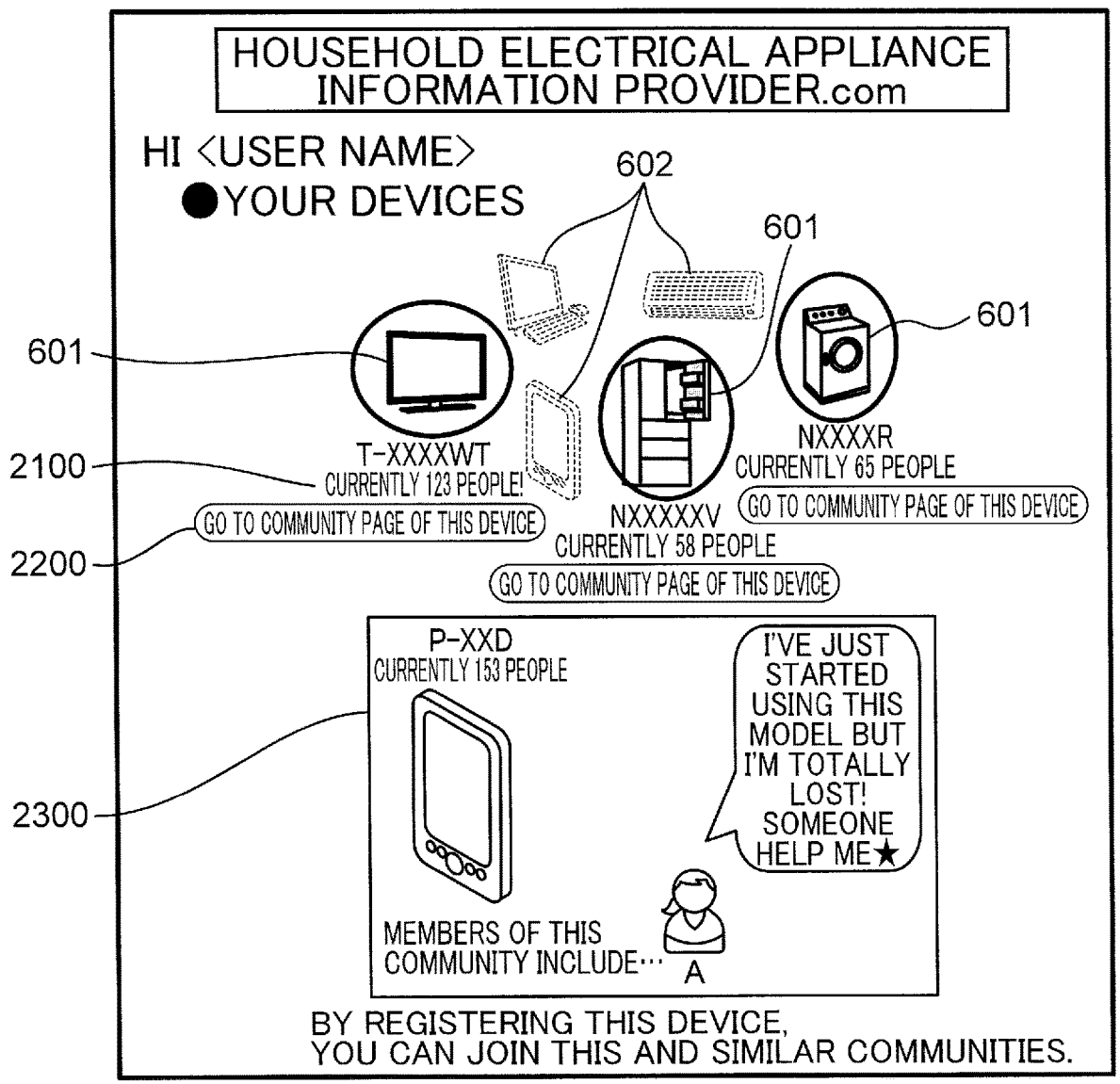
FIG. 41 is a diagram showing another example of a screen that is displayed on a display device according to the present fourth embodiment.

FIG. 41 is a diagram showing another example of a screen that is displayed on the display device 103 according to the present fourth embodiment.

As shown in FIG. 41, a system may be provided which enables a community page regarding a device to be viewed on when a social networking service (SNS) is built in a website and judgment information of the device is set to as to provide log information. The user can view the community page by clicking a button 2200 displayed on the screen. On the community page, users can share information such as methods of using the same device and coping with errors. In addition, the display device 103 may display information 2300 regarding a community of a device set as a device that does not provide log information. Accordingly, a device set as a device that does not provide log information can be prompted to provide log information.

As described above, according to the present fourth embodiment, since information regarding a related device set as a device that provides log information is displayed, the user can be guided toward a service.

Moreover, in the respective embodiments described above, each component may be constituted by dedicated hardware. Alternatively, each component may be realized by executing a software program suitable for each component. Each component may be realized by having a program executing unit such as a CPU or a processor read and execute a software program recorded on a recording medium such as a hard disk and a semiconductor memory.

While a control method and a control method according to one or a plurality of aspects have been described based on embodiments, the present invention is not limited to such embodiments. The application of various modifications obvious to those skilled in the art to the present embodiments as well aspects constructed by combining components of different embodiments may be included in a scope of the one or a plurality of aspects without departing from the spirit and scope of the present invention.

While cases where the plurality of devices 101 are household electrical appliances that are used in ordinary homes and the like have been described in the respective embodiments above, the plurality of devices 101 may be, for example, an industrial device such as a machine tool that is used in a factory or the like.

(Types of Services)

The techniques described in all of the embodiments above may be realized by, for example, the following types of cloud services. However, the types of cloud services that realize the techniques described in the aspects above are not limited to the following types.

(Service Type 1: Proprietary Data Center Type Cloud Service)

Figure 42:
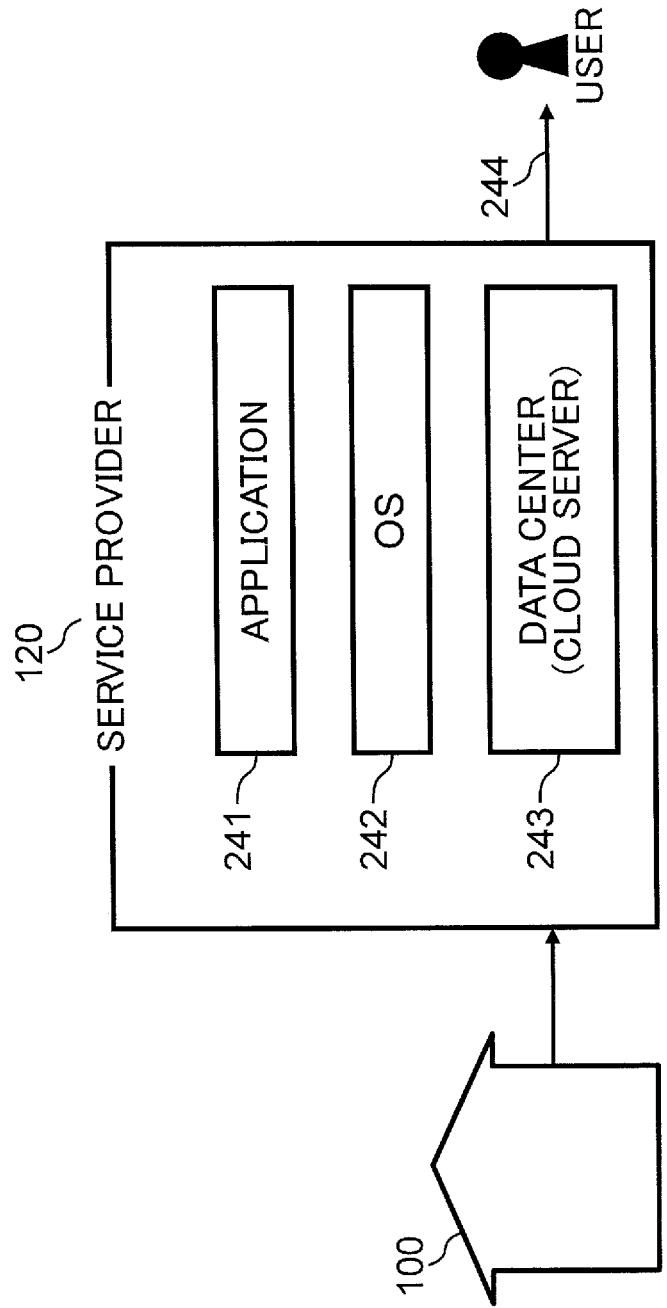
FIG. 42 is a diagram showing an overview of a service that is provided by an information provision system of service type 1 (proprietary data center type cloud service).

FIG. 42 is a diagram showing an overview of a service that is provided by an information provision system of service type 1 (proprietary data center type cloud service). In the present type, the service provider 120 acquires information from the group 100 and provides service to a user. In the present type, the service provider 120 is equipped with functions of a data center operating company. In other words, the service provider 120 owns a cloud server 243 that manages big data. Therefore, a data center operating company does not exist.

In the present type, the service provider 120 operates and manages the data center (cloud server) 243. In addition, the service provider 120 manages an operating system (OS) 242 and an application 241. The service provider 120 provides service using the OS 242 and the application 241 managed by the service provider 120 (arrow 244).

(Service Type 2: Cloud Service Using IaaS)

Figure 43:
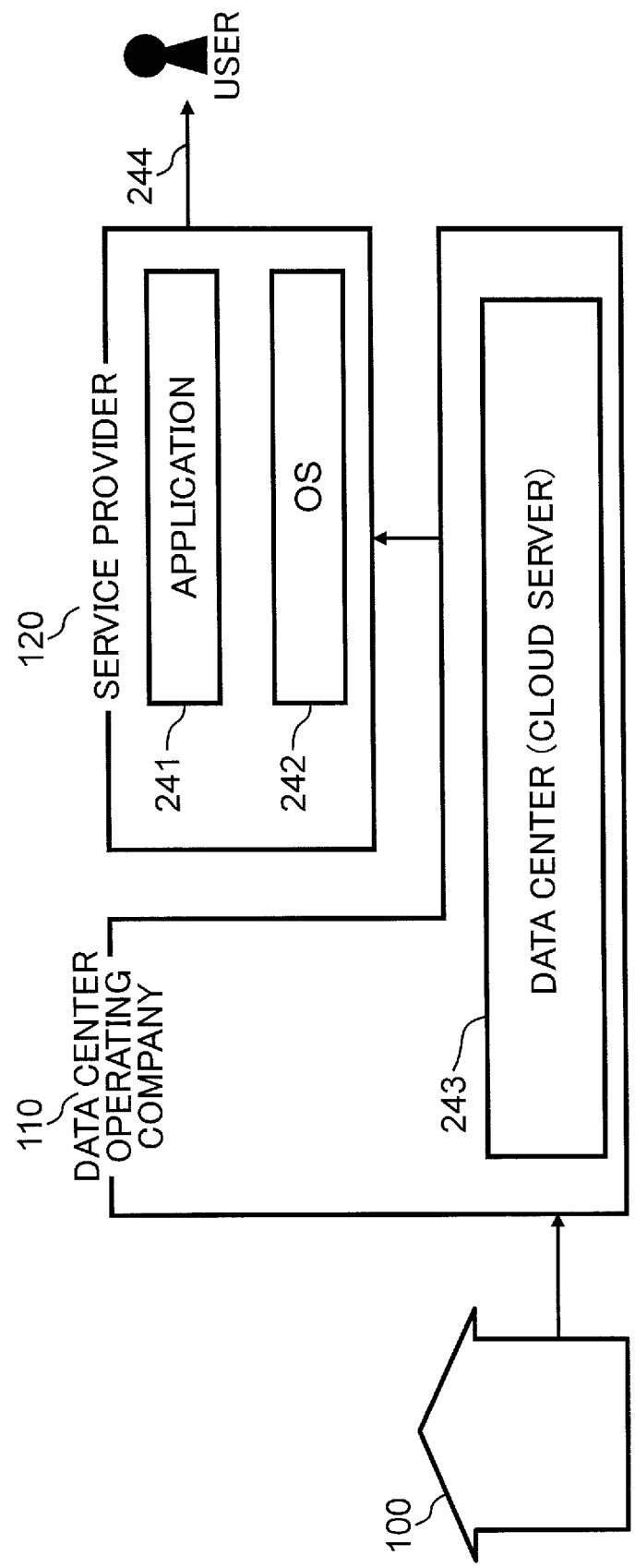
FIG. 43 is a diagram showing an overview of a service that is provided by an information provision system of service type 2 (cloud service using IaaS).

FIG. 43 is a diagram showing an overview of a service that is provided by an information provision system of service type 2 (cloud service using IaaS). In this case, IaaS stands for Infrastructure as a Service and refers to a cloud service provision model where an infrastructure for building and running a computer system itself is provided as an Internet-based service.

In the present type, the data center operating company 110 operates and manages the data center (cloud server) 243. In addition, the service provider 120 manages an OS 242 and an application 241. The service provider 120 provides service using the OS 242 and the application 241 managed by the service provider 120 (arrow 244).

(Service Type 3: Cloud Service Using PaaS)

Figure 44:
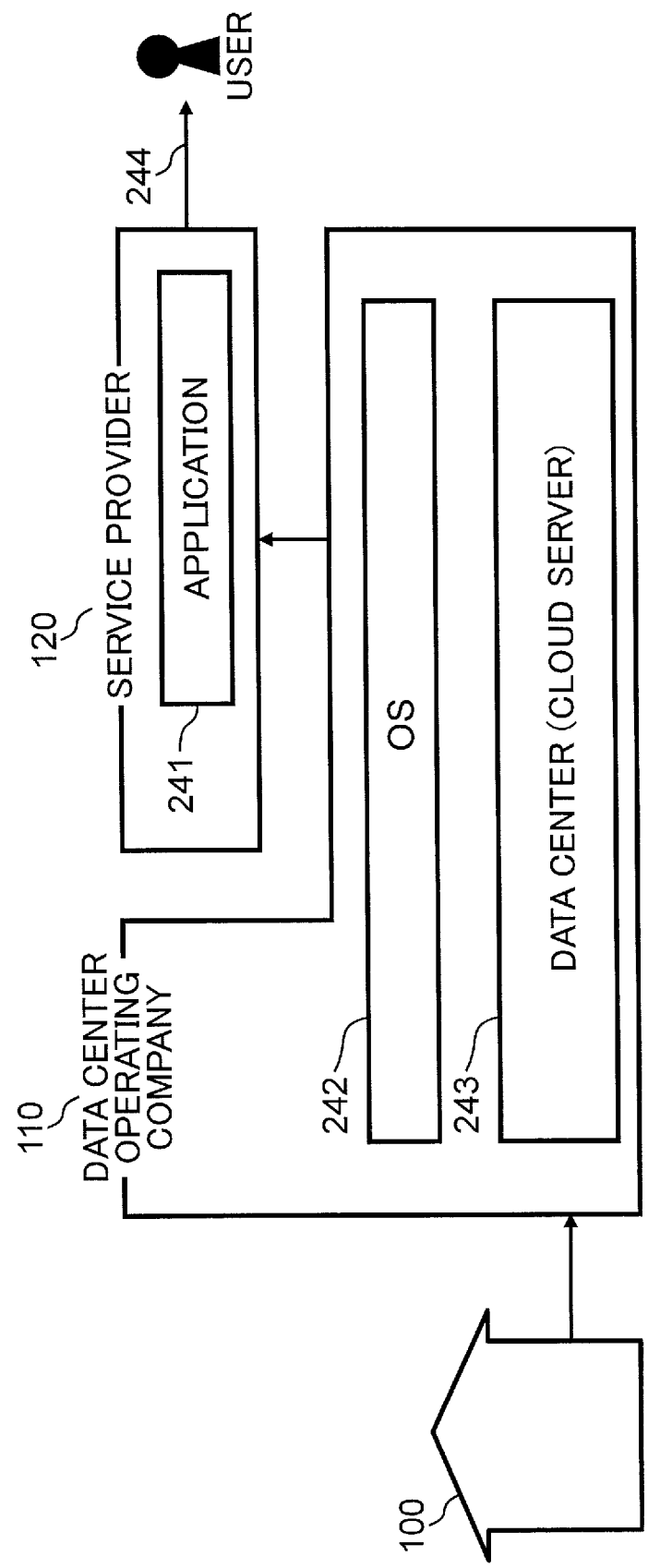
FIG. 44 is a diagram showing an overview of a service that is provided by an information provision system of service type 3 (cloud service using PaaS).

FIG. 44 is a diagram showing an overview of a service that is provided by an information provision system of service type 3 (cloud service using PaaS). In this case, PaaS stands for Platform as a Service and refers to a cloud service provision model where a platform that constitutes a foundation for building and running software is provided as an Internet-based service.

In the present type, the data center operating company 110 manages the OS 242 and operates and manages the data center (cloud server) 243. In addition, the service provider 120 manages the application 241. The service provider 120 provides service using the OS 242 managed by the data center operating company 110 and the application 241 managed by the service provider 120 (arrow 244).

(Service Type 4: Cloud Service Using SaaS)

Figure 45:
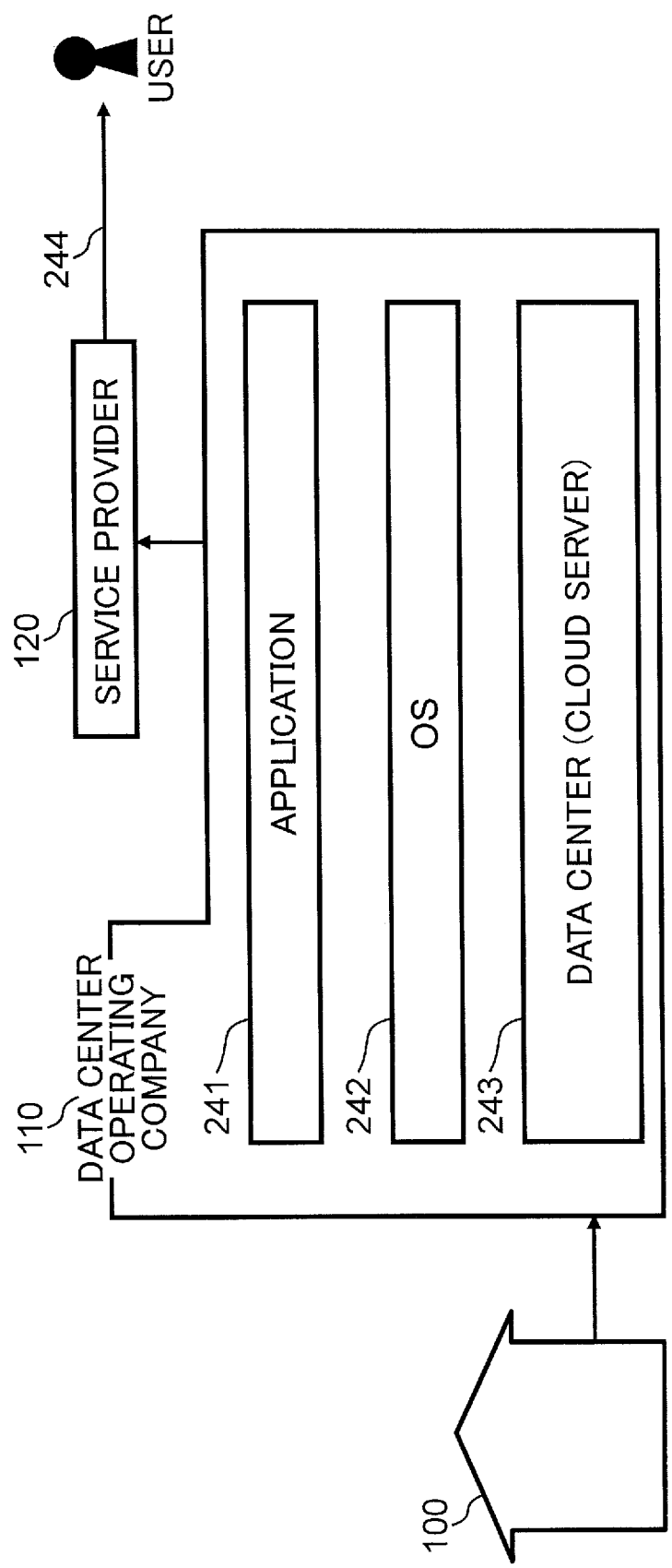
FIG. 45 is a diagram showing an overview of a service that is provided by an information provision system of service type 4 (cloud service using SaaS).

FIG. 45 is a diagram showing an overview of a service that is provided by an information provision system of service type 4 (cloud service using SaaS). In this case, SaaS stands for Software as a Service. The cloud service using SaaS is a cloud service provision model equipped with, for example, a function that enables a user such as a company or an individual that does not own a data center (cloud server) to user an application provided by a platform provider that owns a data center (cloud server) via a network such as the Internet.

In the present type, the data center operating company 110 manages the application 241, manages the OS 242, and operates and manages the data center (cloud server) 243. In addition, the service provider 120 provides service using the OS 242 and the application 241 managed by the data center operating company 110 (arrow 244).

As described above, the service provider 120 provides service in all types of cloud services. In addition, for example, an OS, an application, a database for big data, and the like may be developed in-house or may be outsourced by the service provider or the data center operating company.

The following modifications can also be applied to the present invention.

First Modification

A control method according to a first modification is a control method of controlling a display device which controls a plurality of devices via a network and which displays images regarding the plurality of devices, the control method including the steps of: sensing connection of the plurality of devices to the network; specifying whether or not log information regarding usage of a device is to be provided to a service operator for each of the plurality of devices; and controlling the display device so as to display an image regarding a device set as a device that provides the log information to the service operator and an image regarding a device set as a device that does not provide the log information to the service operator by display methods that differ from each other.

Second Modification

A control system according to a second modification is a control system for controlling a display device which controls a plurality of devices via a network and which displays images regarding the plurality of devices, the control system including: a connection sensing unit that senses connection of the plurality of devices to the network; an information provision specifying unit that specifies whether or not log information regarding usage of a device is to be provided to a service operator for each of the plurality of devices; and a device control unit which controls the display device so as to display an image regarding a device set as a device that provides the log information to the service operator and an image regarding a device set as a device that does not provide the log information to the service operator by display methods that differ from each other.

Third Modification

A display method according to a third modification is a display method of displaying images regarding a plurality of devices connected to a computer on a display device that connects to the computer via a network, the display method including: causing the computer to sense connection of a plurality of devices other than the display device to the network; causing the computer to specify whether or not log information regarding usage set for the plurality of devices is to be provided to a service operator; and causing the display device to display an image regarding a device set as a device that provides the log information to the service operator in a first display mode and display an image regarding a device set as a device that does not provide the log information to the service operator in a second display mode.

INDUSTRIAL APPLICABILITY

The information management method according to the present invention enables devices that provide log information to a service operator and devices that do not provide log information to a service operator to be readily recognized and is useful as an information management method in a control system that collects log information regarding usage of a plurality of devices associated with a same identifier from the plurality of devices via a network.

In addition, the control system according to the present invention enables devices that provide log information to a service operator and devices that do not provide log information to a service operator to be readily recognized and is useful as a control system that collects log information regarding usage of a plurality of devices associated with a same identifier from the plurality of devices via a network.

Furthermore, a display device control method according to the present invention enables devices that provide log information to a service operator and devices that do not provide log information to a service operator to be readily recognized and is useful as a control method of a display method used in a control system that collects log information regarding usage of a plurality of devices associated with a same identifier from the plurality of devices via a network.

The invention claimed is:

1. An information management method in a control system that collects log information via a network from a plurality of devices, respectively, the log information relating to usage of the respective devices, the plurality of devices being associated with a same identifier, the information management method comprising:
   accepting in each of the plurality of devices an input by a user, the input setting whether or not the respective device provides the log information of the respective device to a server;
   receiving judgment information set according to the input by the user in each of the plurality of devices, respectively, the judgment information indicating whether or not the log information of the respective device is to be provided to a server;
   specifying, by the control system, a specific device which is not owned by an owner of the plurality of devices and which is equipped with a function for connecting to the network from information regarding the plurality of devices; and
   providing commands to the display device to display first icon images representing a plurality of devices owned by the owner and a second icon image representing the specific device not owned by the owner, the first icon images being displayed so as to have a different appearance than the second icon image being displayed.

* * * * *